(12) United States Patent
Weng

(10) Patent No.: US 11,518,316 B1
(45) Date of Patent: Dec. 6, 2022

(54) CROSS ROOF BAR

(71) Applicant: Ningbo Diroan Auto Accessories Co., Ltd., Cixi (CN)

(72) Inventor: Rongjie Weng, Cixi (CN)

(73) Assignee: NINGBO DIROAN AUTO ACCESSORIES CO., LTD., Cixi (CN)

( * ) Notice: Subject to any disclaimer, the term of this patent is extended or adjusted under 35 U.S.C. 154(b) by 0 days.

(21) Appl. No.: 17/831,883

(22) Filed: Jun. 3, 2022

(30) Foreign Application Priority Data

Jan. 28, 2022 (CN) .......................... 202220237900.8
Apr. 13, 2022 (CN) .......................... 202220837657.3

(51) Int. Cl.
*B60R 9/058* (2006.01)

(52) U.S. Cl.
CPC .................................... *B60R 9/058* (2013.01)

(58) Field of Classification Search
CPC ............ B60R 9/058; B60R 9/045; B60R 9/04
See application file for complete search history.

(56) References Cited

U.S. PATENT DOCUMENTS

| | | | |
|---|---|---|---|
| 5,794,826 A * | 8/1998 | Cronce | B60R 9/045 116/282 |
| 6,398,090 B1 | 6/2002 | Chimenti | |
| 7,367,481 B2 | 5/2008 | Barbara | |
| 10,232,691 B1 * | 3/2019 | Weng | B60J 7/198 |
| 2004/0118886 A1 * | 6/2004 | Mirshafiee | B60R 9/045 224/315 |
| 2012/0205410 A1 * | 8/2012 | Steckel | B60R 9/048 224/309 |
| 2013/0284779 A1 * | 10/2013 | Sautter | B60R 9/048 224/323 |
| 2017/0050576 A1 * | 2/2017 | Ferman | H04B 17/21 |
| 2018/0236946 A1 * | 8/2018 | Shen | B60R 9/058 |
| 2021/0268968 A1 * | 9/2021 | Olaison | B60R 9/058 |
| 2022/0032853 A1 * | 2/2022 | McFadden | B60R 9/058 |

FOREIGN PATENT DOCUMENTS

| | | |
|---|---|---|
| CN | 202753878 U | 2/2013 |
| CN | 203047087 U | 7/2013 |
| CN | 203305912 U | 11/2013 |
| CN | 104085354 A | 10/2014 |
| CN | 107458318 A | 12/2017 |

\* cited by examiner

*Primary Examiner* — Brian D Nash
(74) *Attorney, Agent, or Firm* — Crowell & Moring LLP

(57) ABSTRACT

The present disclosure relates to a cross roof bar. The cross roof bar includes a main crossbeam, a base, an adjustment seat, and a fastening assembly that connects the base to the adjustment seat. The main crossbeam has a first sliding groove. The fastening assembly includes a fastening member, a fastening nut, and a fastening bolt. The fastening member is swingably mounted to the adjustment seat, and includes a lower fastening portion and an upper fastening portion connected to the lower fastening portion and slidably mounted to the first sliding groove. The fastening member is turnable to cause the upper fastening portion to press the main crossbeam on a top of the base. The cross roof bar can clamp longitudinal bars having different sizes, and a position of the main crossbeam on a roof can be adjusted, thereby helping construct a stable cargo support on the roof.

18 Claims, 19 Drawing Sheets

A

A-A

CROSS ROOF BAR

RELATED APPLICATIONS

This application claims priority to Chinese Patent Application No. 202220237900.8 filed with the China National Intellectual Property Administration on Jan. 28, 2022, which is incorporated herein by reference in its entirety. This application also claims priority to Chinese Patent Application No. 202220837657.3 filed with the China National Intellectual Property Administration on Apr. 13, 2022, which is incorporated herein by reference in its entirety.

FIELD OF THE TECHNOLOGY

This application relates to the field of automobile accessories, and in particular to a cross roof bar for a vehicle.

BACKGROUND OF THE DISCLOSURE

Some vehicles have only a small luggage space therein, which is inadequate when many people go out. A roof cross bar, which is an accessory mounted to a roof of a vehicle such as an SUV and an off-road vehicle, spans a top of the vehicle. A user of the vehicle can conveniently fix luggage to the roof when going out.

There are at least the following problems in the art: The mounting between a left bracket and a right bracket and the crossbeam is insecure. As a result, on a bumpy road section, the crossbeam may come loose, resulting in a possibility of falling of items. The present disclosure describes various embodiments of cross roof bars, addressing at least one of the problems/issues discussed above.

SUMMARY

A cross roof bar is also referred to as a top holder, and is a rack mounted to a longitudinal bar for carrying bulky items. The cross roof bar includes a main crossbeam and two clamping seats mounted to the main crossbeam. The clamping seats can clamp the longitudinal bar on top of an automobile to fix the cross roof bar to a roof of the automobile. In order to cause the cross roof bar to adapt to more vehicle models, the clamping seats of the cross roof bar are designed to clamp the longitudinal support beams having different sizes. After tightly clamping the longitudinal bar, the clamping seats may be further fastened with the cross roof bar. The present disclosure describes a novel cross roof bar that can clamp longitudinal bars having different sizes.

The present disclosure provides a roof rack for a vehicle. The roof rack for a vehicle includes a left bracket and a right bracket parallel to each other. Sliding grooves are provided on opposite sides of the left bracket and the right bracket, and at least one rack crossbeam is arranged between the left bracket and the right bracket. Sliding seats matching one ends of the sliding grooves are arranged on both ends of the rack crossbeam, and the sliding seats are slidably assembled in the sliding grooves. By means of mating between the left bracket and the right bracket and the crossbeam, a position of the crossbeam can be flexibly adjusted.

In order to clamp longitudinal bars having different sizes on a cross roof bar, the present disclosure provides a cross roof bar.

The cross roof bar provided in the present disclosure adopts the following technical solutions.

The cross roof bar includes a main crossbeam, a base configured to abut against one side of a longitudinal bar, an adjustment seat configured to abut against an other side of the longitudinal bar, and a fastening assembly that connects the base to the adjustment seat; the main crossbeam has a first sliding groove arranged in a length direction and having an opening on a lower side; the fastening assembly includes a fastening member, a fastening nut, and a fastening bolt; the fastening member is swingably mounted to the adjustment seat, and includes a lower fastening portion located in the adjustment seat and an upper fastening portion connected to the lower fastening portion and slidably mounted to the first sliding groove; the fastening member is turnable to cause the upper fastening portion to press the main crossbeam on a top of the base; the fastening nut is rotatably mounted to the lower fastening portion, an axis of rotation of the fastening nut is parallel to a width direction of the adjustment seat, and a threaded hole of the fastening nut is arranged perpendicular to the axis of rotation of the fastening nut; and a bolt head of the fastening bolt is snap-fitted to the base, and a screw of the fastening bolt is threadedly mated with the fastening nut.

According to the above technical solution, during clamping of the longitudinal bar on a roof by using the cross roof bar, the fastening bolt is first rotated to drive the fastening nut, the fastening member, and the adjustment seat to move toward the base, until the base and the adjustment seat are clamped on two sides of the longitudinal bar. Then the fastening bolt is further rotated to further drive the fastening nut to move toward the bolt head. Since the fastening member is swingably mounted to the adjustment seat, and the adjustment seat abuts against one side of the longitudinal bar and therefore cannot be further moved, the lower fastening portion of the fastening member swings toward the bolt head, and the upper fastening portion deflects in a same circumferential direction, until the upper fastening portion presses the main crossbeam on the top of the base. The cross roof bar can clamp the longitudinal bars having different sizes. In addition, after the base and the adjustment seat are clamped on the longitudinal bar, the main crossbeam is locked. Therefore, a position of the main crossbeam on the roof can be adjusted, thereby helping constructing a stable cargo support on the roof.

Optionally, the base has a first slidable portion slidably mated with the main crossbeam in the first sliding groove; and the adjustment seat has a second slidable portion slidably mated with the main crossbeam in the first sliding groove.

According to the above technical solution, the base can be slidably mounted to the main crossbeam by using the first slidable portion, and the adjustment seat can be slidably mounted to the main crossbeam by using the second slidable portion. In this way, the base and the adjustment seat can be slid more stably relative to each other, thereby helping stably clamp the base and the adjustment seat on the two sides of the longitudinal bar.

Optionally, the base is a housing structure and is provided with a sliding slot configured for the adjustment seat to be inserted; and the base has therein a support plane configured for a top surface of the adjustment seat to be slidably attached.

According to the above technical solution, the adjustment seat can be slid along the support plane, so that stability of the relative sliding between the base and the adjustment seat is further enhanced.

Optionally, the second slidable portion has an abutment sidewall configured for the upper fastening portion to abut, a spring groove is provided on an inner wall of the adjustment seat close to the bolt head, a pressure spring is arranged in the spring groove, and one end of the pressure spring abuts against the lower fastening portion and an other end of the pressure spring abuts against a bottom surface of the spring groove.

According to the above technical solution, when the fastening member drives the adjustment seat to slide toward the bolt head, the upper fastening portion abuts against the abutment sidewall, and the lower fastening portion transfers the driving force to the adjustment seat by using the pressure spring, so that the fastening member can transfer the driving force to the adjustment seat more stably, thereby causing the adjustment seat to move toward the base more stably. During unlocking of the fastening assembly, the fastening bolt is rotated in an opposite direction, so that the fastening nut is moved away from the bolt head. The pressure spring helps return the fastening member.

Optionally, a limiting protruding piece configured to abut against a lower edge of the sliding slot is arranged on a side of the adjustment seat facing the bolt head.

According to the above technical solution, when the longitudinal bar is not clamped by the cross roof bar, the fastening bolt may be rotated to cause the limiting protruding piece to abut against the lower edge of the base at the sliding slot. In this way, disorder of the adjustment seat and the base during transfer of the cross roof bar is minimized.

Optionally, a clamping groove configured to clamp the longitudinal bar is formed outside the base, at the clamping groove, the base has an upper abutment sidewall configured for an upper side of the longitudinal bar to abut and a lower abutment sidewall configured for a lower side of the longitudinal bar to abut, and the adjustment seat has a fastening sidewall configured for the lower side of the longitudinal bar to abut.

According to the above technical solution, when the base and the adjustment seat are clamped on the longitudinal bar, three-point positioning can be performed on the longitudinal bar in a circumferential direction. By means of the clamping structure, the longitudinal bar can be desirably clamped, so that the cross roof bar is unlikely to be released from the longitudinal bar.

Optionally, the lower fastening portion includes a swingable plate and two supporting protruding pieces arranged perpendicular to the swingable plate and opposite to each other, and rotation holes configured for the fastening nut to be rotatably mounted are arranged opposite to each other on the supporting protruding pieces.

According to the above technical solution, the fastening nut is rotatably mounted to the two limiting protruding pieces. By means of the rotatable mounting, the fastening nut can transfer the driving force to the lower fastening portion more effectively, thereby driving the fastening member to move.

Optionally, the base includes a plastic housing and a metal framework mounted in the plastic housing, and the bolt head of the fastening bolt is snap-fitted to the metal framework.

According to the above technical solution, the base includes the plastic housing and the metal framework. Therefore, overall structural strength of the base is improved, and a probability that the base breaks is reduced. Since the fastening bolt is a metal member, during rotation of the fastening bolt, only little damage is caused to the base by the rotation of the bolt head. Therefore, a service life of the base is prolonged.

Optionally, the metal framework is further provided with an arcuate support portion, and the arcuate support portion is supported in the plastic housing and configured to clamp a part of an inner wall of the longitudinal bar.

According to the above technical solution, when the base is clamped on one side of the longitudinal bar, the longitudinal bar abuts against a part of the plastic housing configured to clamp the longitudinal bar, and the arcuate support portion of the metal framework is supported inside the part, so that a squeezing force of the longitudinal bar to the plastic housing is transferred to the arcuate support portion. Therefore, a probability that the part is broken by the squeezing is reduced, thereby prolonging a service life of the cross roof bar.

Optionally, the base is provided with an unlocking hole directly facing the bolt head, a locking assembly is arranged between the bolt head and a sidewall of the base provided with the unlocking hole, the locking assembly includes a lock cylinder mounted to the base and a locking member mounted to an output head of the lock cylinder; when the lock cylinder is in a locked state, the locking member is shielded between the bolt head and the unlocking hole; or when the lock cylinder is in an unlocked state, the locking member moves away from a space between the bolt head and the unlocking hole.

According to the above technical solution, the fastening bolt can be rotated with a tool only after the lock cylinder is switched from the locked state to the unlocked state with a corresponding key. By means of the locking assembly, anti-theft performance of the cross roof bar is improved, and safety of the cross roof bar is enhanced.

Based on the above, the present disclosure includes at least one of the following beneficial effects.

1. The cross roof bar can clamp the longitudinal bar by means of mating of the base, the adjustment seat, and the fastening assembly, so as to be adaptively mounted to longitudinal bars having different models and sizes. The main crossbeam is locked only after the fastening assembly is further adjusted. Therefore, the position of the main crossbeam on the roof can be adjusted, thereby constructing a stable cargo support on the roof.

2. The base is slidably mounted to the main crossbeam by using the first slidable portion, and the adjustment seat is slidably mounted to the main crossbeam by using the second slidable portion, and can be slidably inserted into the sliding slot of the base. In this way, the base and the adjustment seat can slide relatively stably relative to each other.

3. The adjustment seat is provided with the abutment sidewall configured for the upper fastening portion of the fastening member to abut and the pressure spring abutting against the lower fastening portion, so that the driving force transferred to the adjustment seat by the fastening portions is stable.

4. The locking assembly is further arranged on the base. Therefore, the anti-theft performance of the cross roof bar is improved, and the safety of the cross roof bar is enhanced.

In order to resolve issues related to insecure mounting of a roof rack, the present disclosure describes another cross roof rack for a vehicle.

The cross roof rack for a vehicle provided in the present disclosure adopts the following technical solutions:

A cross roof rack for a vehicle includes a cross bar, where fixing structures configured for fixing are symmetrically arranged on two sides of the cross bar, each of the fixing structures includes a fixing seat and a clamping seat, the fixing seat is connected to a side wall of the cross bar, the clamping seat is arranged opposite to the fixing seat, an area for fixing is formed between the fixing seat and the clamping seat, a sliding groove is provided on an inner side wall of the cross bar along a length direction, a slidable block is arranged on a side of the clamping seat, the slidable block is slidably connected to an inner side wall of the sliding groove, a locking structure fixed to the fixing seat is arranged in the clamping seat, the locking structure includes a locking block, a locking rod, and two abutment strips, a mounting groove is provided on a side wall of the clamping seat, the locking block is arranged on a bottom wall of the mounting groove, the two abutment strips are arranged on an inner side wall of the mounting groove and abut against a side wall of the locking block, a locking hole is provided on the side wall of the locking block along a thickness direction, the locking rod is threadedly connected in the locking hole, a side of the locking rod runs through the clamping seat and extends into the fixing seat, and a connecting hole configured for rotation of the locking rod is provided on a side of the fixing seat away from the clamping seat.

Since a rack cannot be securely mounted, the rack may come loose on bumpy road sections. According to the above technical solution, the fixing structures are symmetrically mounted to the two sides of the cross bar, each of the fixing structures is composed of the fixing seat and the clamping seat, the area for fixing is formed between the fixing seat and the clamping seat, the sliding groove is provided on the inner side wall of the cross bar, the slidable block is welded to a side wall of the clamping seat and is slidable in the sliding groove, the locking structure is arranged in the clamping seat, and the locking structure is composed of the locking block, the locking rod, and the two abutment strips. A bar on a top of a vehicle is clamped between the clamping seat and the fixing seat, a hardware tool is inserted into the connecting hole and is caused to come contact with an end portion of the locking rod, and the locking rod is rotated. Since the locking rod is threadedly connected to the locking hole, the locking block drives the clamping seat to move. At this time, the slidable block slides in the sliding groove, until the clamping seat and the fixing seat are both pressed against the bar on the top of the vehicle, thereby realizing fixing of the bar on the top of the vehicle to the cross bar. In this way, an area for placing items is formed. By arranging the fixing seat, the clamping seat, the locking block, the locking rod, and the abutment strips, the mounting is reliable, and a possibility that the cross bar is detached from the bar on the top of the vehicle on a bumpy road is reduced, thereby facilitating stable mounting between the clamping seat and the fixing seat. In addition, the structure is simple, and the mounting is convenient, thereby reducing assembly costs.

Optionally, a connecting seat is arranged in the fixing seat, a through hole runs through a side wall of the connecting seat, a side of the locking rod is arranged on an inner side wall of the through hole, and the inner side wall of the through hole is arranged coaxially with an inner side wall of the connecting hole.

According to the above technical solution, an operator welds the connecting seat in the fixing seat, the through hole is provided on the side wall of the connecting seat, and a side of the locking rod is located in the through hole. By arranging the connecting seat and the through hole, the locking rod is fixed. Therefore, a possibility that the locking rod deviates in the fixing seat is reduced, the operator can realize quick docking between the hardware tool and the locking rod, and the operation is convenient, thereby improving working efficiency of adjusting the clamping seat.

Optionally, a stop is arranged on a side of the connecting seat close to the cross bar, and the stop is arranged on the inner side wall of the sliding groove and is in interference fit with the inner side wall of the sliding groove.

According to the above technical solution, the stop is welded to the side wall of the connecting seat, and the stop is located in the sliding groove and is in interference fit with the inner side wall of the sliding groove. By arranging the stop, stability of the connecting seat is improved, a possibility that the connecting seat deforms during the rotation of the locking rod is reduced, and the fixing seat is further limited, thereby improving connection stability of the fixing seat.

Optionally, an anti-theft structure configured to prevent rotation of the locking rod is arranged in the fixing seat, the anti-theft structure includes a lock cylinder and a rotary sleeve, the lock cylinder and the rotary sleeve are both arranged in the fixing seat, the lock cylinder is rotatably connected in the fixing seat, the rotary sleeve is sleeved on a side wall of the lock cylinder, and when the lock cylinder is in a locked state, the rotary sleeve is shielded between the connecting hole and the locking rod, or when the lock cylinder is in an unlocked state, the rotary sleeve moves away from a space between the connecting hole and the locking rod.

Since the locking rod is only screwed by using the hardware tool, the cross bar may be stolen when the vehicle is placed outside. According to the above technical solution, the anti-theft structure is mounted in the fixing seat, and the anti-theft structure is composed of the lock cylinder and the rotary sleeve. When the locking rod is tightened by using the hardware tool, after the clamping seat and the fixing seat are fixed to the bar on the top of the vehicle, the operator inserts a key into the lock cylinder, and rotates the lock cylinder to cause the lock cylinder to enter the locked state, and the rotary sleeve is shielded between the connecting hole and the locking rod. By arranging the lock cylinder and the rotary sleeve, anti-theft performance of the cross bar is improved, and a possibility that the cross bar is stolen is reduced, thereby improving safety of the cross bar.

Optionally, a first elastic pad is arranged on a side of the clamping seat close to the fixing seat, a second elastic pad is arranged on a side of the fixing seat close to the clamping seat, and the first elastic pad and the second elastic pad are arranged opposite to each other.

According to the above technical solution, the operator fixes the first elastic pad to the side wall of the clamping seat and fixes the second elastic pad to the side wall of the fixing seat by using glue, the first elastic pad and the second elastic pad are arranged opposite to each other, and the first elastic pad and the second elastic pad are both made of elastic materials. By arranging the first elastic pad and the second elastic pad, a possibility that the bar on the top of the vehicle deforms as a result of a relatively large clamping force during clamping between the clamping seat and the fixing seat and the bar is reduced, and direct contact between the bar on the top of the vehicle and the clamping seat and the fixing seat is avoided, thereby protecting the bar on the top of the vehicle and prolonging a service life.

Optionally, a plurality of reedings are arranged on the first elastic pad and the second elastic pad.

According to the above technical solution, the plurality of reedings are integrally formed on side walls of the first elastic pad and the second elastic pad. By arranging the reedings, a frictional force of the clamping seat and the fixing seat on the bar on the top of the vehicle is increased, and a possibility of a failure of clamping between the clamping seat and the fixing seat as a result of sliding of the bar on the top of the vehicle during clamping of the clamping seat is reduced, and stability after the clamping is improved, thereby reducing a possibility that the bar on the top of the vehicle is detached.

Optionally, the cross bar includes a bar body and two end covers, the two end covers are respectively located on two sides of the bar body in a length direction, an insert is arranged on a side of each of the end covers, the insert is inserted into the sliding groove of the bar body, and the insert matches the inner side wall of the sliding groove.

According to the above technical solution, the cross bar is composed of the bar body and the two end covers, the inserts are welded to the side walls of the two end covers, and the inserts matches the inner side wall of the sliding groove. The operator aligns the inserts to the sliding groove of the bar body, and presses the inserts into the sliding groove, so as to realize mounting between the end covers and the bar body. By arranging the end covers, the bar body, and the inserts, disassembling and assembling become convenient, thereby facilitating repair and replacement by the operator.

Optionally, a limiting block is arranged on a side wall of the insert, and a limiting groove configured for the limiting block to be inserted is provided on the inner side wall of the sliding groove.

According to the above technical solution, the limiting block is integrally formed on the side wall of the insert, and the limiting groove is provided on the inner side wall of the sliding groove. When the insert is inserted into the sliding groove, the limiting block is gradually inserted into the limiting groove. By arranging the limiting block and the limiting groove, the end covers are further fixed, so that a possibility that the end covers are detached from the bar body is reduced, thereby improving mounting stability.

In summary, the present disclosure includes at least one of the following beneficial technical effects:

1. By arranging the fixing seat, the clamping seat, the locking block, the locking rod, and the abutment strips, the mounting is reliable, and a possibility that the cross bar is detached from the bar on the top of the vehicle on a bumpy road is reduced, thereby facilitating stable mounting between the clamping seat and the fixing seat. In addition, the structure is simple, and the mounting is convenient, thereby reducing assembly costs.

2. By arranging the lock cylinder and the rotary sleeve, anti-theft performance of the cross bar is improved, and a possibility that the cross bar is stolen is reduced, thereby improving safety of the cross bar.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other accompanying drawings from these accompanying drawings without creative efforts.

Figure 1:
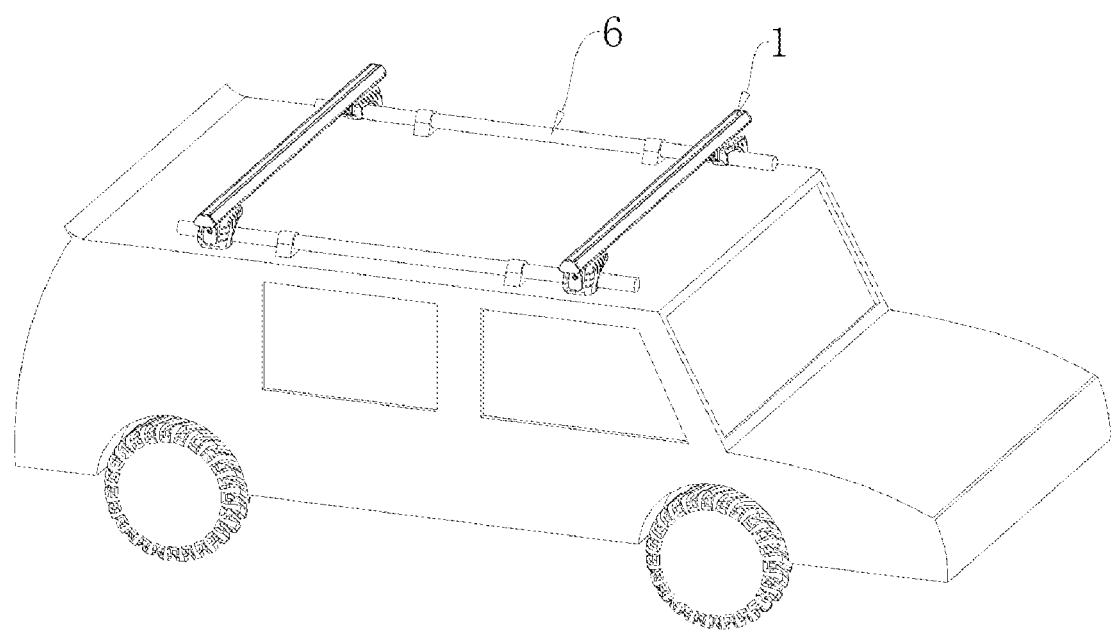
FIG. 1 is a schematic diagram in the related art in which a cross roof bar is mounted to an automobile.

Reference numerals: 1. Main crossbeam; 11. Crossbeam body; 111. First sliding groove; 12. Crossbeam end cover; 121. Inserting portion; 2. Base; 21. Plastic housing; 22. Metal framework; 221. Snapping seat; 2211. Snapping plate; 22111. Snapping hole; 2212. Support plate; 22121. Adjustment hole; 2213. Connecting plate; 222. First slidable portion; 223. Metal liner panel; 2231. Arcuate support portion; 224. Metal support plate; 2241. Support plane; 23. Unlocking hole; 24. Gun head portion; 241. Sliding slot; 25. Gun handle portion; 26. Clamping groove; 261. Upper abutment sidewall; 262. Lower abutment sidewall; 27. Mounting sleeve; 28. First slideway; 3. Adjustment seat; 31. Second slidable portion; 311. Abutment sidewall; 32. Mounting cavity; 321. Avoidance sidewall; 322. First port; 323. Second port; 324. Spring groove; 33. Mounting end cover; 34. Swing hole; 35. Pressure spring; 36. Fastening sidewall; 37. Limiting protruding piece; 4. Fastening assembly; 41. Fastening member; 411. Upper fastening portion; 412. Lower fastening portion; 4121. Swingable plate; 4122. Support protruding piece; 4123. Rotation hole; 42. Fastening nut; 421. Rotary post; 422. Threaded hole; 43. Fastening bolt; 431. Bolt head; 432. Screw; 51. Lock cylinder; 52. Locking member; 6. Longitudinal bar; 7. Clamping mechanism; 91. Cross bar; 911. Bar body; 9111. Sliding groove; 9112. Limiting groove; 912. End cover; 9121. Insert; 9122. Limiting block; 92. Fixing structure; 93. Fixing seat; 931. Connecting hole; 932. Connecting seat; 9321: Stop; 933. Through hole; 934. Second elastic pad; 94. Clamping seat; 941. Slidable block; 9411. Slidable strip; 942. Mounting groove; 943. First elastic pad; 9431: Reeding; 95. Locking structure; 951. Locking block; 9511. Locking hole; 952. Locking rod; 953. Abutment strip; 96. Anti-theft structure; 961. Lock cylinder; 962. Rotary sleeve.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The present disclosure describes various embodiments of a cross roof bar. The present disclosure relates to a cross roof bar, and belongs to the field of automobile accessories. The cross roof bar includes a main crossbeam, a base, an adjustment seat, and a fastening assembly that connects the base to the adjustment seat. The main crossbeam has a first sliding groove. The fastening assembly includes a fastening member, a fastening nut, and a fastening bolt. The fastening member is swingably mounted to the adjustment seat, and includes a lower fastening portion and an upper fastening portion connected to the lower fastening portion and slidably mounted to the first sliding groove. The fastening member is turnable to cause the upper fastening portion to press the main crossbeam on a top of the base. The fastening nut is rotatably mounted to the lower fastening portion. An axis of rotation of the fastening nut is parallel to a width direction of the adjustment seat. A threaded hole of the fastening nut is arranged perpendicular to the axis of rotation of the fastening nut. A bolt head of the fastening bolt is snap-fitted to the base, and a screw of the fastening bolt is threadedly mated with the fastening nut. The cross roof bar can clamp longitudinal bars having different sizes, and a position of the main crossbeam on a roof can be adjusted, thereby helping construct a stable cargo support on the roof.

Referring to FIG. 1, in order to improve transportation capabilities of automobiles of some models, longitudinal bars 6 are respectively arranged on two sides of the roofs of the automobiles. The longitudinal bars 6 are arranged in a length direction of the automobiles. Cross roof bars are mounted to the automobile having the longitudinal bars 6. Two ends of each cross roof bar are respectively clamped on the corresponding longitudinal bars 6. Two cross roof bars are usually mounted to each automobile, to form a stable support structure on the roof of the automobile. A user may fix cargoes on the support structure. Therefore, the transportation capability of the automobile is improved. For all longitudinal bars 6, refer to FIG. 1. Details are not enumerated below again.

Figure 2:
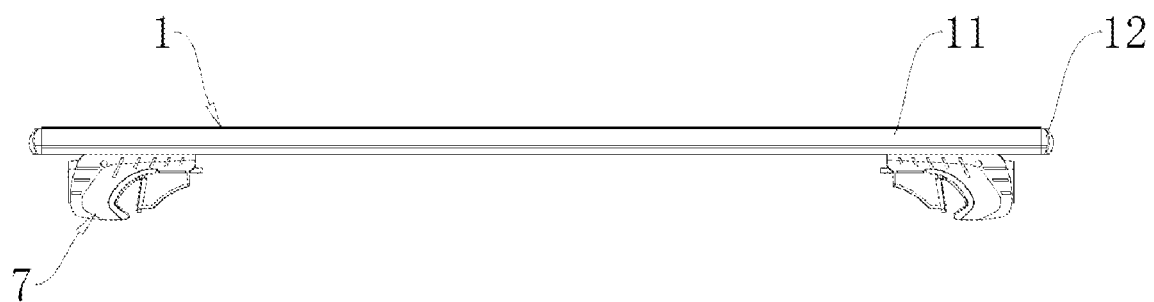
FIG. 2 is a front view of a cross roof bar according to an embodiment.

An embodiment of the present disclosure discloses a cross roof bar. Referring to FIG. 2, the cross roof bar includes a main crossbeam 1 and two clamping mechanisms 7 that are mounted to the main crossbeam 1 and configured to be clamped on the corresponding longitudinal bars 6. When the cross roof bar is not fastened on the longitudinal bars 6, the clamping mechanisms 7 may be slid along a length direction of the main crossbeam 1. When the cross roof bar is fastened on the longitudinal bars 6, the clamping mechanisms 7 are fastened with the main crossbeam 1. In this way, the main crossbeam 1 and the longitudinal bars 6 are locked relative to each other.

Figure 3:
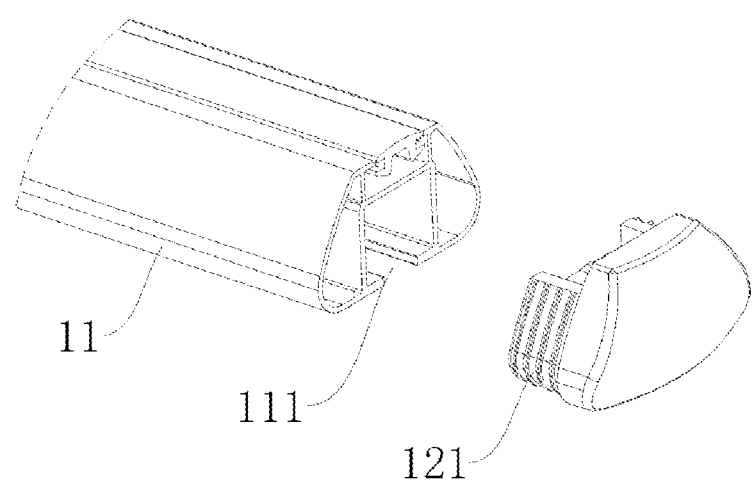
FIG. 3 is a schematic diagram of mating between a crossbeam body and a crossbeam end cover according to an embodiment.

Referring to FIG. 2 and FIG. 3, the main crossbeam 1 includes a crossbeam body 11 and crossbeam end covers 12 mounted to two ends of the crossbeam body 11. The crossbeam body 11 is made of an aluminum alloy material. A bottom surface of the main crossbeam 1 is a plane. The crossbeam body 11 has a first sliding groove 111 arranged along the length direction, and the first sliding groove 111 has a T-shaped cross section. The first sliding groove 111 has a rectangular opening formed on a bottom surface of the crossbeam body 11. Each crossbeam end cover 12 has an inserting portion 121 mated with a cross-sectional hole groove of the crossbeam body 11. Therefore, the crossbeam end cover 12 is unlikely to be disengaged from the crossbeam body 11.

Figure 4:
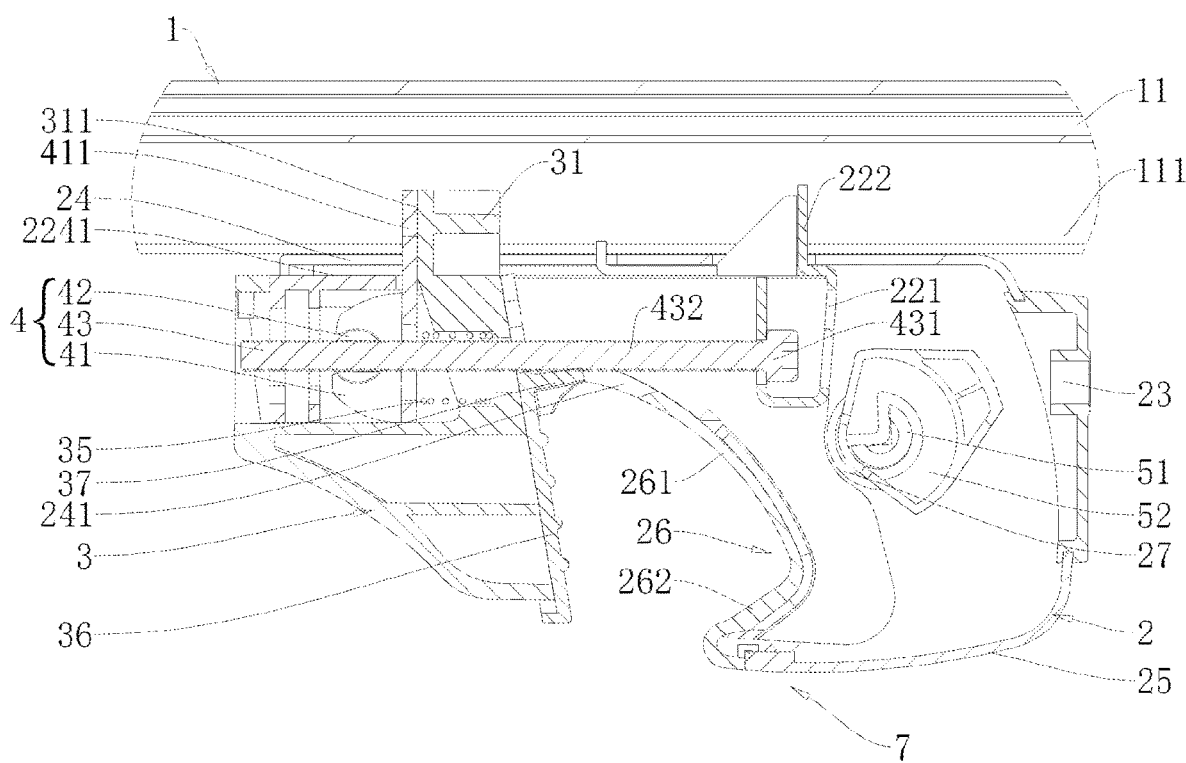
FIG. 4 is a schematic cross-sectional view in which a clamping mechanism is not mounted to a longitudinal bar according to an embodiment.

Referring to FIG. 4, each clamping mechanism includes a base 2 configured to abut against one side of one of the longitudinal bars 6, an adjustment seat 3 configured to abut against an other side of the longitudinal bar 6, and a fastening assembly 4 that connects the base 2 to the adjustment seat 3. The fastening assembly 4 is configured to adjust a distance between the base 2 and the adjustment seat 3. The fastening assembly 4 includes a fastening member 41, a fastening nut 42, and a fastening bolt 43.

Figure 5:
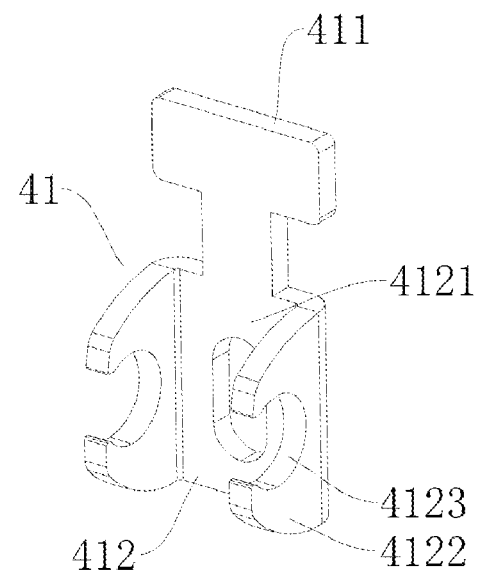
FIG. 5 is a schematic structural diagram of a fastening member according to an embodiment.

Referring to FIG. 4 and FIG. 5, the fastening member 41 is a metal component. The fastening member 41 includes an upper fastening portion 411 and a lower fastening portion 412. The upper fastening portion 411 is a T-shaped plate, and may be slidably mounted in the first sliding groove 111. The lower fastening portion 412 includes a swingable plate 4121 and two supporting protruding pieces 4122 arranged perpendicular to the swingable plate 4121 and opposite to each other. Rotation holes 4123 configured for the fastening nut 42 to be rotatably mounted are arranged opposite to each other on the supporting protruding pieces 4122. The swingable plate 4121 is further provided with a through hole configured for a screw 432 of the fastening bolt 43 to extend through. The through hole is a strip-shaped hole.

Figure 6:
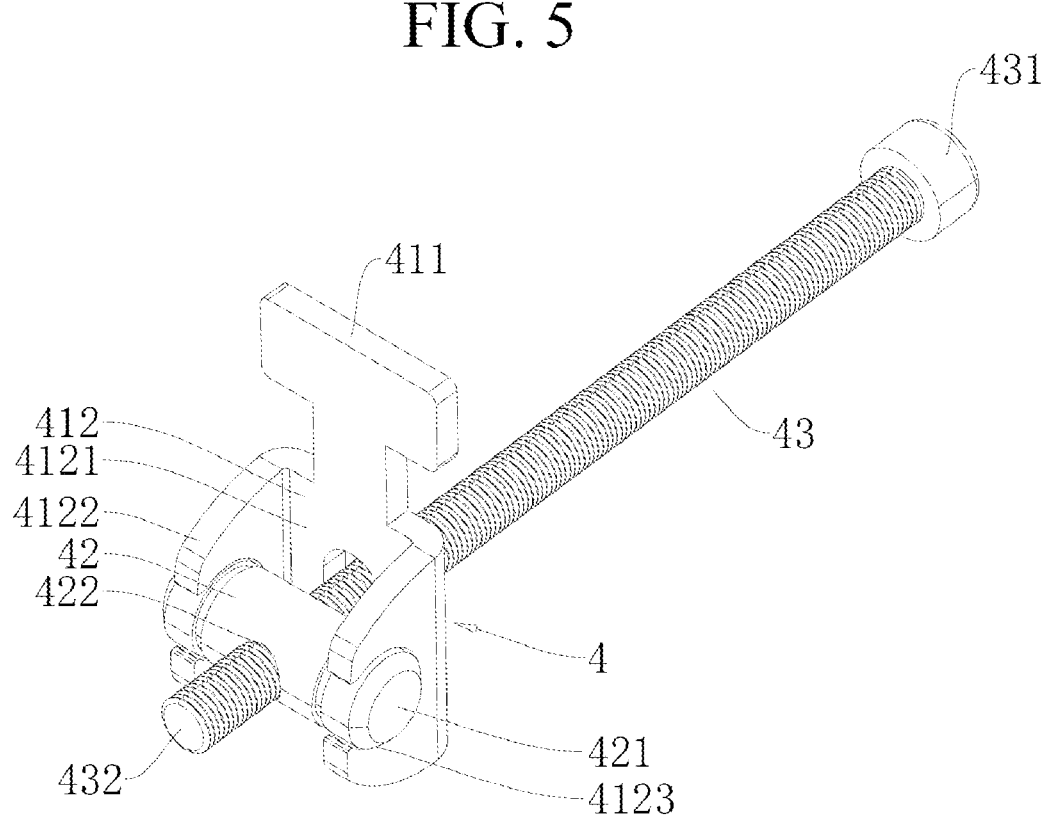
FIG. 6 is a schematic structural diagram of a fastening assembly according to an embodiment.

Referring to FIG. 5 and FIG. 6, the fastening nut 42 is overall cylindrical. Rotary posts 421 configured to be mated with the rotation holes 4123 are arranged on two ends of the fastening nut 42. In this way, after the fastening nut 42 is mounted to the fastening member 41, the fastening nut 42 can be rotated relative to the fastening member 41. A threaded hole 422 of the fastening nut 42 is perpendicular to an axis of rotation of the fastening nut 42 on the fastening member 41.

Referring to FIG. 5 and FIG. 6, the fastening bolt 43 includes a bolt head 431 and the screw 432. The bolt head 431 is cylindrical, and is provided with an orthohexagonal hole on a side facing away from the screw 432. The screw 432 is threadedly mated with the fastening nut 42. When the fastening bolt 43 is rotated relative to the fastening nut 42, a relative distance between the bolt head 431 and the fastening member 41 can be adjusted.

Figure 7:
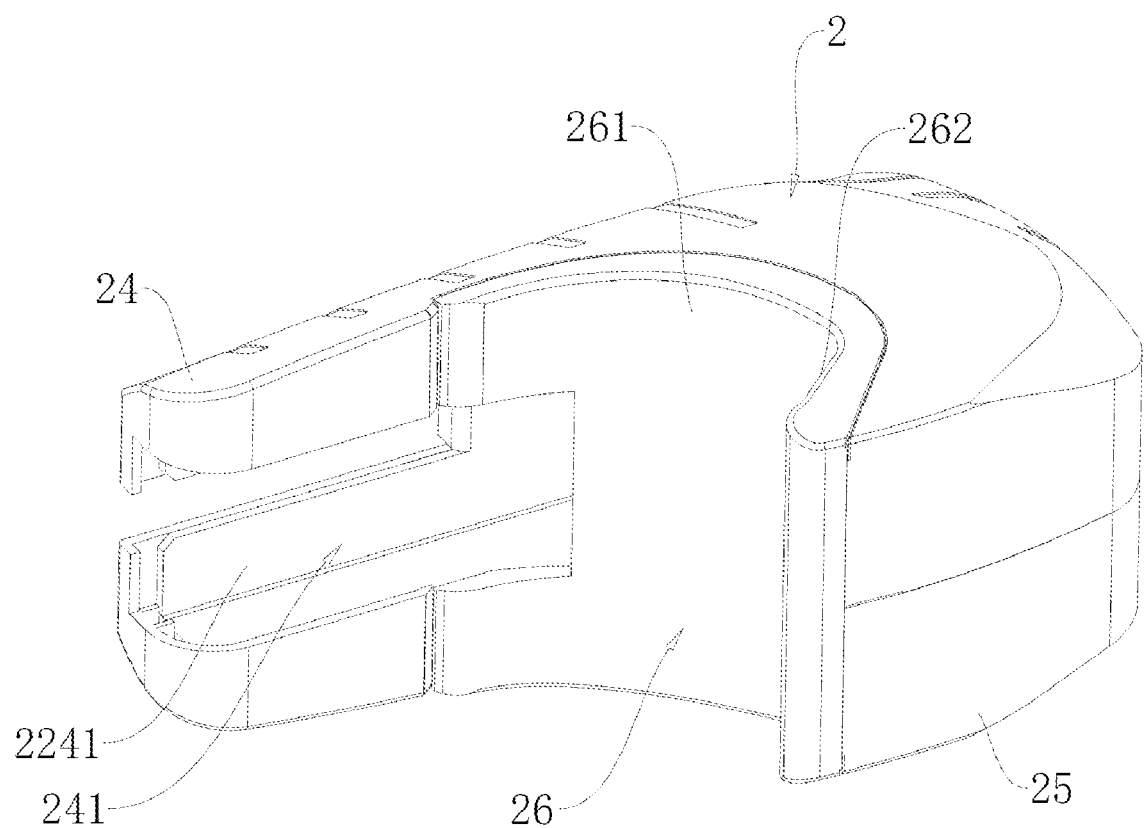
FIG. 7 is a schematic structural diagram of a sliding slot of a base according to an embodiment.

Referring to FIG. 4 and FIG. 7, the base 2 is overall a gun-shaped housing structure. The base 2 includes a gun head portion 24 and a gun handle portion 25. A top surface of the gun head portion 24 is a plane, and may be attached to the bottom surface of the main crossbeam 1. A lower side of the gun head portion 24 is provided with a sliding slot 241 configured for the adjustment seat 3 to be slidably snapped. An inner top surface of the gun head portion 24 is provided with a support plane 2241 configured for the adjustment seat 3 to be slidably attached.

Referring to FIG. 4 and FIG. 7, a clamping groove 26 configured to clamp the longitudinal bar 6 is formed on a side of the gun handle portion 25 facing the adjustment seat 3. At the clamping groove 26, the base 2 has an upper abutment sidewall 261 configured for an upper side of the longitudinal bar 6 to abut and a lower abutment sidewall 262 configured for a lower side of the longitudinal bar 6 to abut. An upper side of the longitudinal bar 6 is a part of an outer surface of the longitudinal bar 6 facing upward or obliquely upward during travelling of an automobile on a horizontal plane. A lower side of the longitudinal bar 6 is a part of the outer surface of the longitudinal bar 6 facing downward or obliquely downward during the travelling of the automobile on the horizontal plane.

Figure 8:
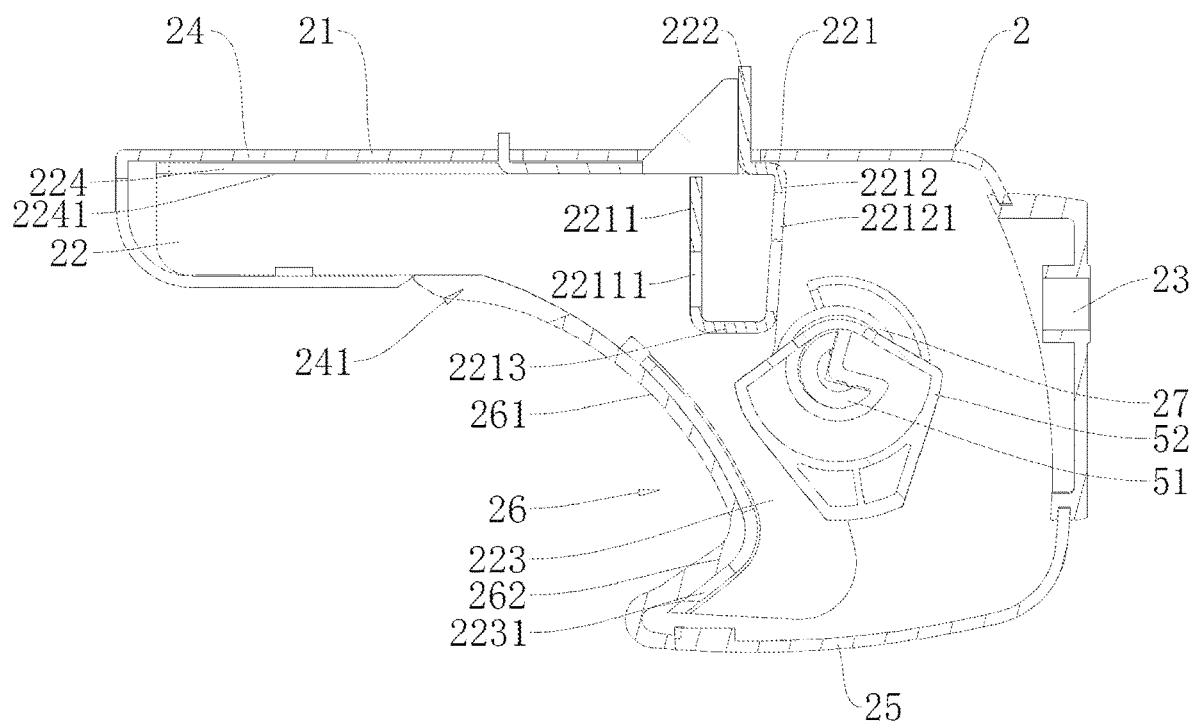
FIG. 8 is a schematic cross-sectional view of a base according to an embodiment.

Referring to FIG. 4 and FIG. 8, a snapping seat 221 directly facing the sliding slot 241 is further arranged in a cavity of the base 2. The snapping seat 221 is configured for the bolt head 431 of the fastening bolt 43 to be snap-fitted. The snapping seat 221 is overall U-shaped, and includes a snapping plate 2211 close to the sliding slot, a support plate 2212 away from the sliding slot, and a connecting plate 2213 that connects the snapping plate 2211 to the support plate 2212. The snapping plate 2211 is provided with a snapping hole 22111 configured for the screw 432 to extend through and preventing the bolt head 431 from extending through. The snapping hole 22111 is a strip-shaped hole. The support plate 2212 is provided with an adjustment hole 22121 directly facing the snapping hole 22111, so that the fastening bolt 43 can be conveniently snap-fitted to the snapping plate 2211 and the fastening bolt 43 can be conveniently rotated.

Figure 9:
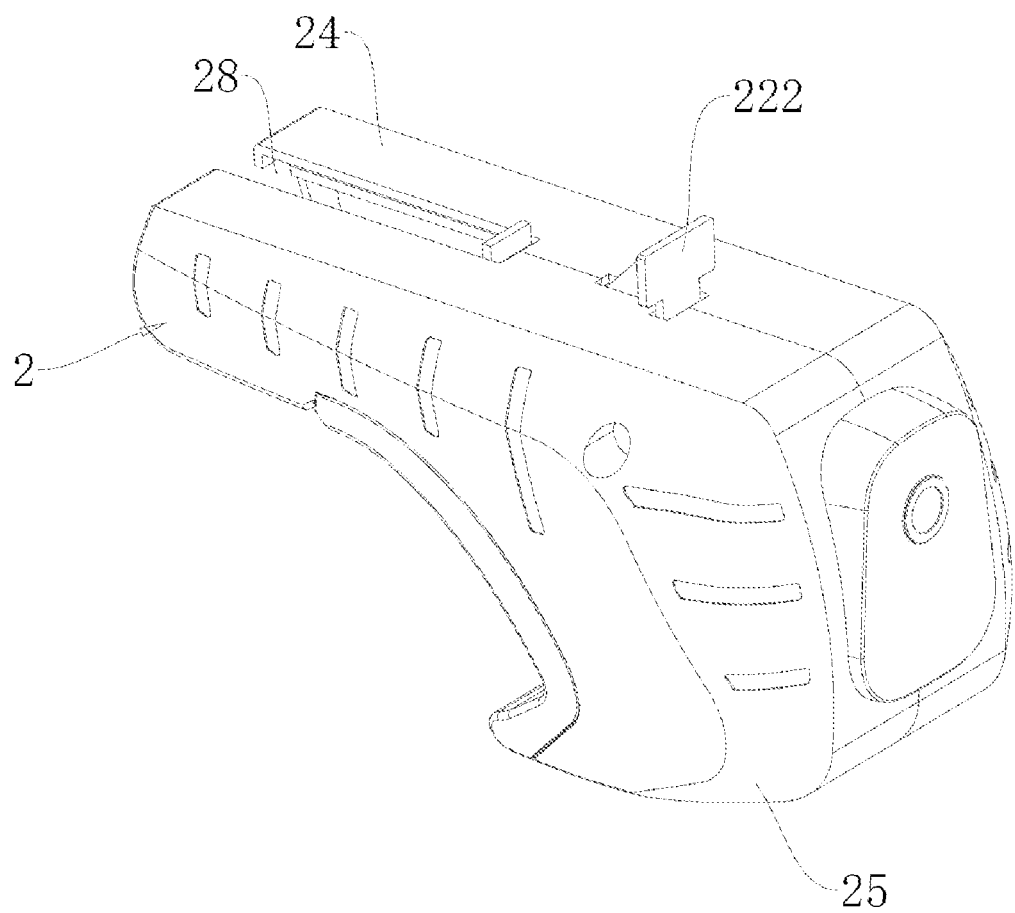
FIG. 9 is a schematic structural diagram of a top structure of the base according to an embodiment.

Referring to FIG. 4 and FIG. 9, the base 2 is further provided with a first slidable portion 222 that may be slidably mounted in the first sliding groove 111. The first slidable portion 222 is a T-shaped plate structure. After a top surface of the base 2 is attached to the bottom surface of the main crossbeam 1, the first slidable portion 222 can be smoothly slid in the first sliding groove 111 of the main crossbeam 1.

Figure 10:
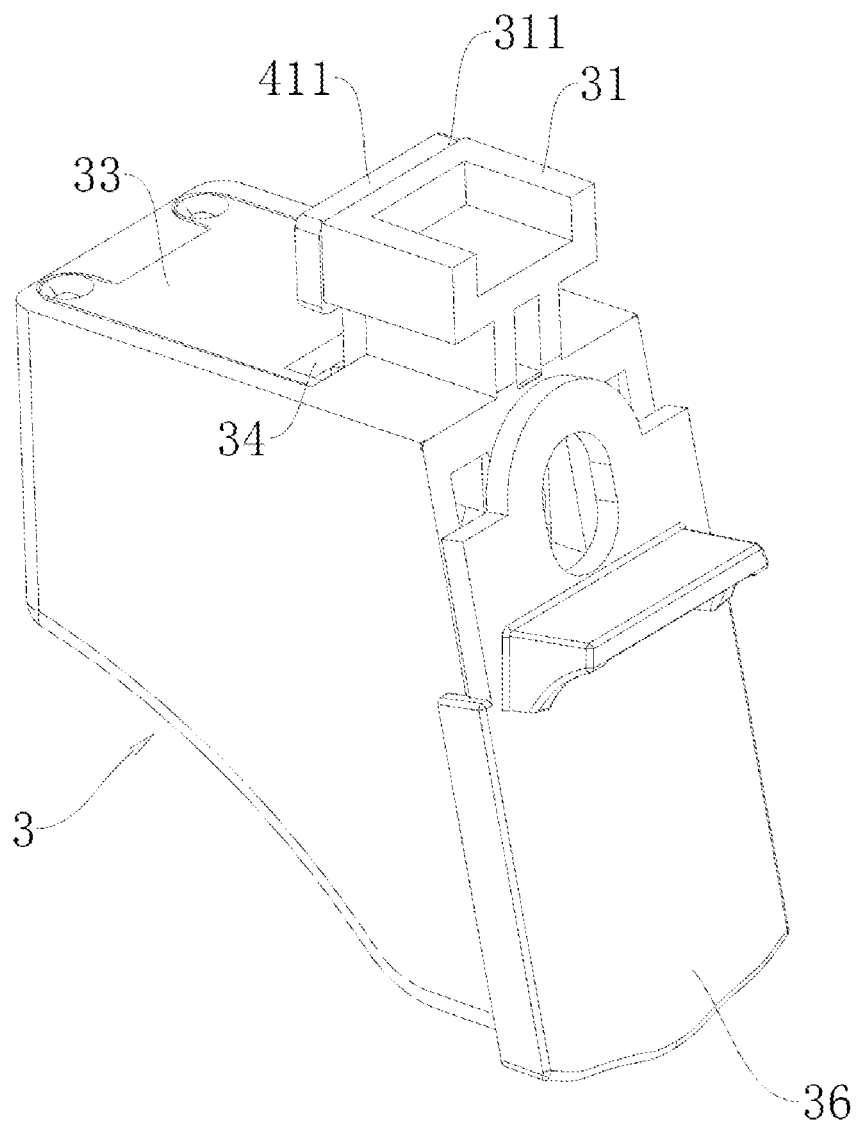
FIG. 10 is a schematic structural diagram of an adjustment seat according to an embodiment.

Referring to FIG. 4 and FIG. 10, the adjustment seat 3 can be slid into the base 2 through the sliding slot 241. A top surface of the adjustment seat 3 is attached to the support plane 2241. The adjustment seat 3 is further provided with a second slidable portion 31 slidably mounted in the first sliding groove 111 of the main crossbeam 1. The second slidable portion 31 is overall T-shaped. When the top surface of the adjustment seat 3 is attached to the support plane 2241, the second slidable portion 31 can be smoothly slid in the first sliding groove 111.

Referring to FIG. 4 and FIG. 9, the base 2 is provided with a first slideway 28 configured for the second slidable portion 31 to slide. The second slidable portion 31 is further provided with an abutment sidewall 311 configured for the upper fastening portion 411 of the fastening member 41 to abut.

Figure 11:
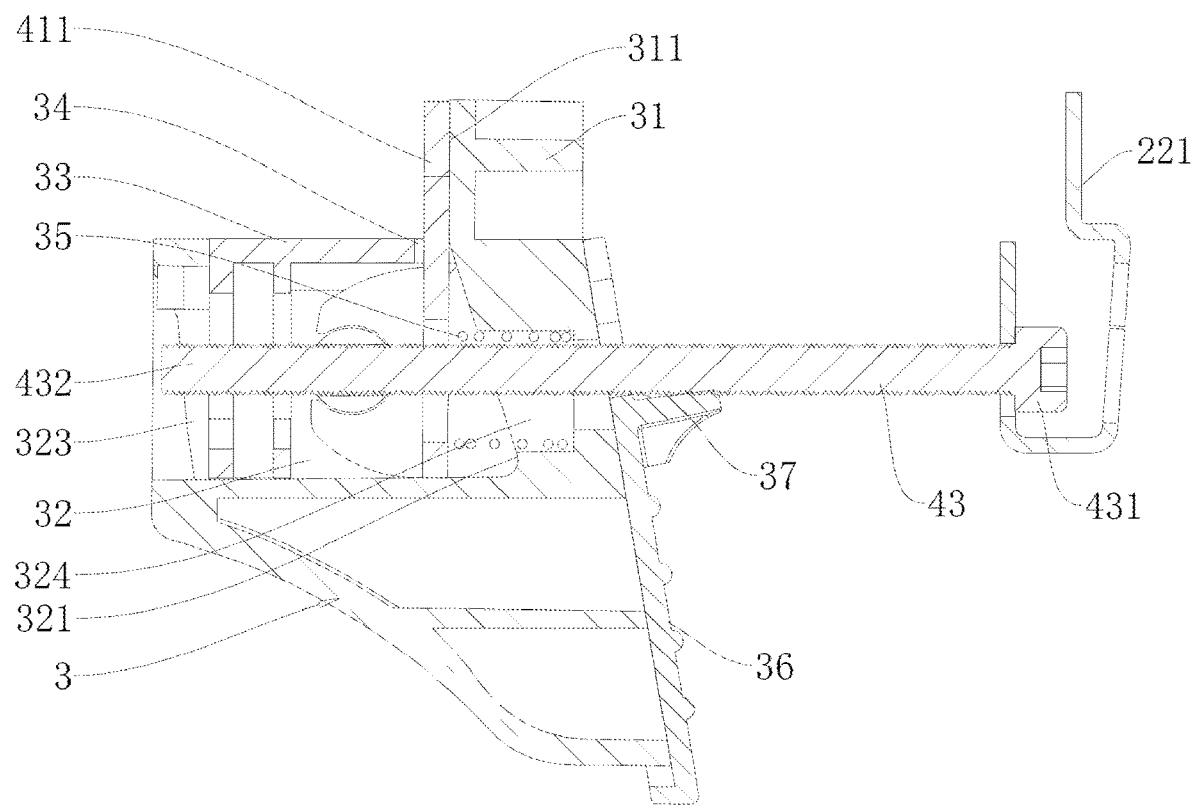
FIG. 11 is a schematic cross-sectional view of mating between the adjustment seat and the fastening assembly according to an embodiment.

Referring to FIG. 10 and FIG. 11, the adjustment seat 3 is further provided with a mounting cavity 32 configured for the lower fastening portion 412 of the fastening member 41 to be mounted. The mounting cavity 32 has a mounting opening formed on the top of the adjustment seat 3. A mounting end cover 33 configured to cover the mounting opening is mounted to the adjustment seat 3 by using screws. When the mounting end cover 33 is mounted to the adjustment seat 3, a swing hole 34 configured for the upper fastening portion 411 to extend is formed on a side of the mounting opening of the adjustment seat 3 close to the second slidable portion 31.

Referring to FIG. 11, an avoidance sidewall 321 is formed on a side of the mounting inner cavity 32 of the adjustment seat 3 close to the snapping seat 221. The avoidance sidewall 321 is arranged obliquely downward along a direction approaching the snapping seat 221, to provide a relatively appropriate swing space for the lower fastening portion 412. A first port 322 configured for the screw 432 of the fastening bolt 43 to extend through is further provided on the avoidance sidewall 321 of the adjustment seat 3. A second port 323 configured for the screw 432 passes to extend through is further provided on a sidewall of the adjustment seat 3 directly facing the avoidance sidewall 321. By means of the second port 323, the adjustment seat 3 adapts to the fastening bolt 43 having a large length.

Referring to FIG. 11, a spring groove 324 is further provided on the avoidance sidewall 321 of the adjustment seat 3, and a pressure spring 35 is arranged in the spring groove 324. One end of the pressure spring 35 abuts against the lower fastening portion 412 of the fastening member 41, and an other end of the pressure spring abuts against a bottom surface of the spring groove 324.

Referring to FIG. 4 and FIG. 11, a lower end of the adjustment seat 3 has a fastening sidewall 36. The fastening sidewall 36 is arranged obliquely downward along a direction approaching the clamping groove 26, so that the fastening sidewall 36 can abut against the lower side of the longitudinal bar 6. By means of mating of the fastening sidewall 36 of the adjustment seat 3, the upper abutment sidewall 261 of the base 2, and the lower abutment sidewall 262 of the base 2, the longitudinal bar 6 can be limited.

Operation of the clamping mechanism mainly includes two steps: a clamping step of clamping the longitudinal bar and a locking step of locking the main crossbeam 1 and the clamping mechanism.

Figure 12:
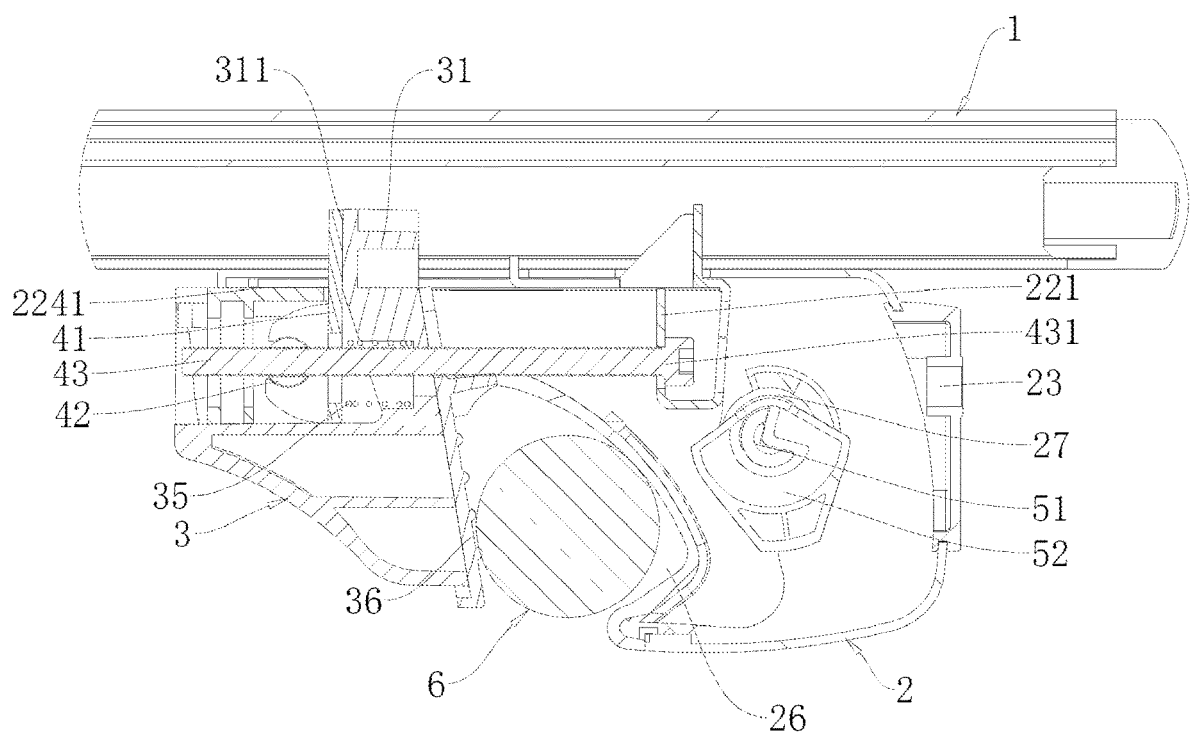
FIG. 12 is a schematic cross-sectional view of the clamping mechanism after completion of a clamping step according to an embodiment.

Referring to FIG. 12, the clamping step is shown in detail as follows. The adjustment seat 3 is pressed on the support plane 2241 of the base 2. In this case, the fastening bolt 43 is in a horizontal state. The fastening member 41 is in a vertical state under the support of the abutment sidewall 311 and the pressure spring 35. That is to say, the upper fastening portion 411 of the fastening member 41 is attached to the abutment sidewall 311. The fastening bolt 43 is rotated, to cause the fastening nut 42 to move toward the bolt head 431, and the fastening nut 42 drives the fastening member 41 and the adjustment seat 3 to move toward the bolt head 431. That is to say, the fastening sidewall 36 of the adjustment seat 3 is moved toward the clamping groove 26 of the base 2, until the fastening sidewall 36 presses the longitudinal bar 6 in the clamping groove 26 of the base 2 and the adjustment seat 3 cannot be further moved toward the bolt head 431.

Figure 13:
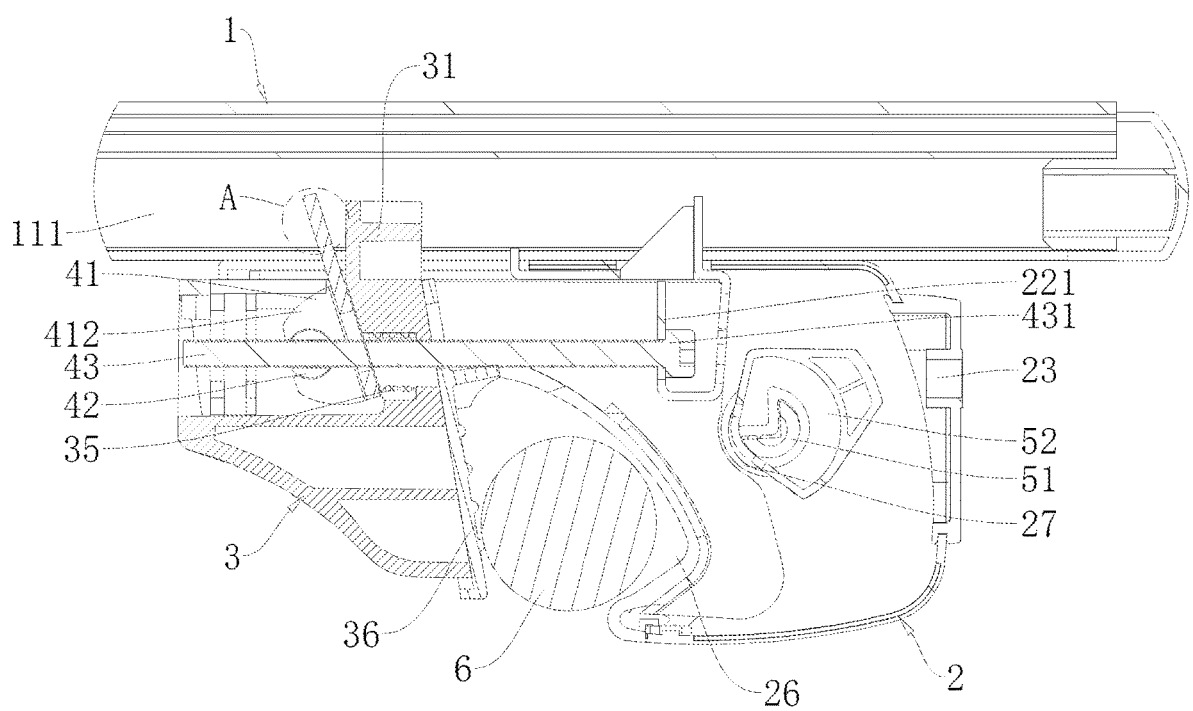
FIG. 13 is a schematic cross-sectional view of the clamping mechanism after completion of a locking step according to an embodiment.
Figure 14:
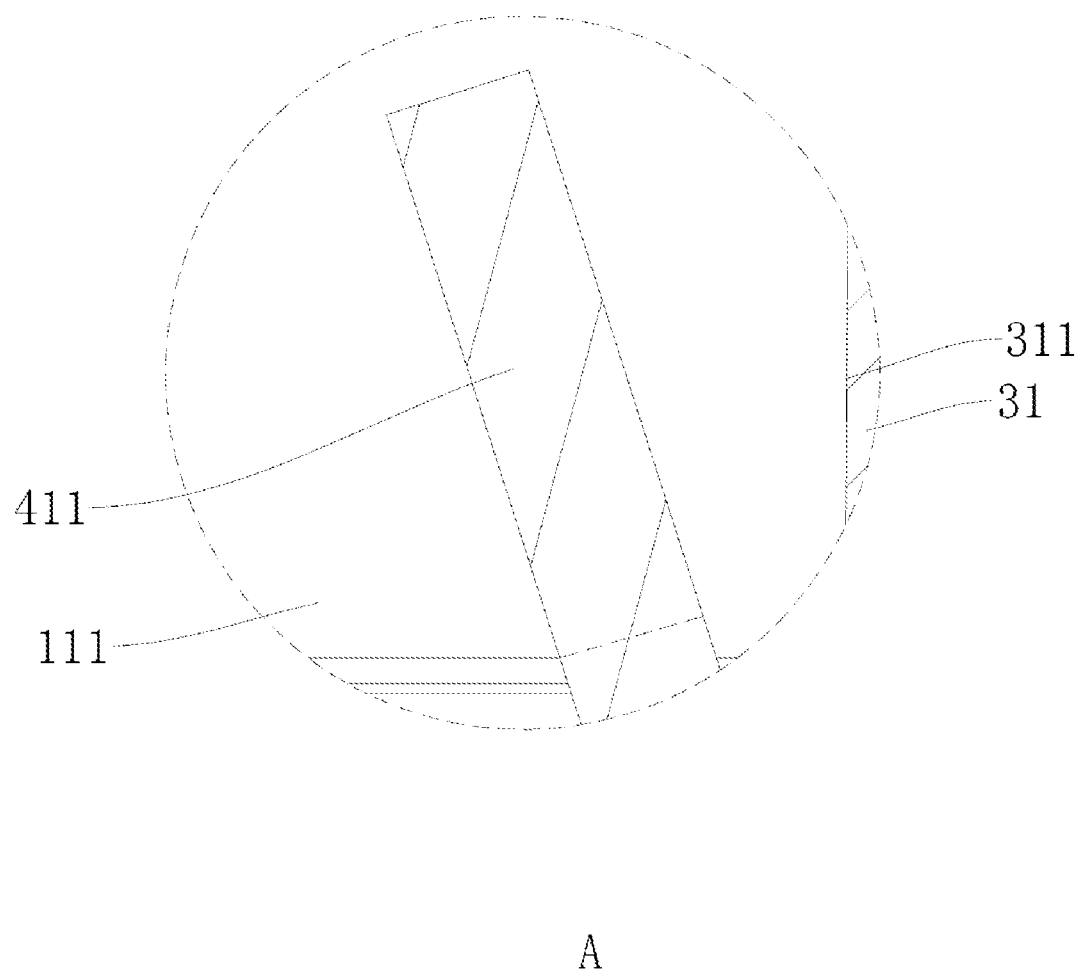
FIG. 14 is a schematic enlarged view of A in FIG. 13.

Referring to FIG. 13 and FIG. 14, the locking step is shown in detail as follows. After the clamping step, the fastening bolt 43 is further rotated, to cause the fastening nut 42 to further move toward the bolt head 431. Since the fastening nut 42 is mounted to the lower fastening portion 412, the fastening member 41 is driven to swing by using a contact line of the fastening member and the second slidable portion 31 as an axis. In this way, the lower fastening portion 412 overcomes the pressure spring 35 to further swing toward the bolt head 431, and the upper fastening portion 411 swings away from the second slidable portion 31. Since the upper fastening portion 411 is located in the first sliding groove 111, the upper fastening portion 411 abuts against the bottom surface of the main crossbeam 1 at the first sliding groove 111, and presses the main crossbeam 1 on the top surface of the base 2. In this way, the main crossbeam 1 is locked at the clamping mechanism.

During unlocking, the fastening bolt 43 is rotated to drive the fastening nut 42 to move away from the bolt head 431. The pressure spring 35 can drive the fastening member 41 to return.

Figure 15:
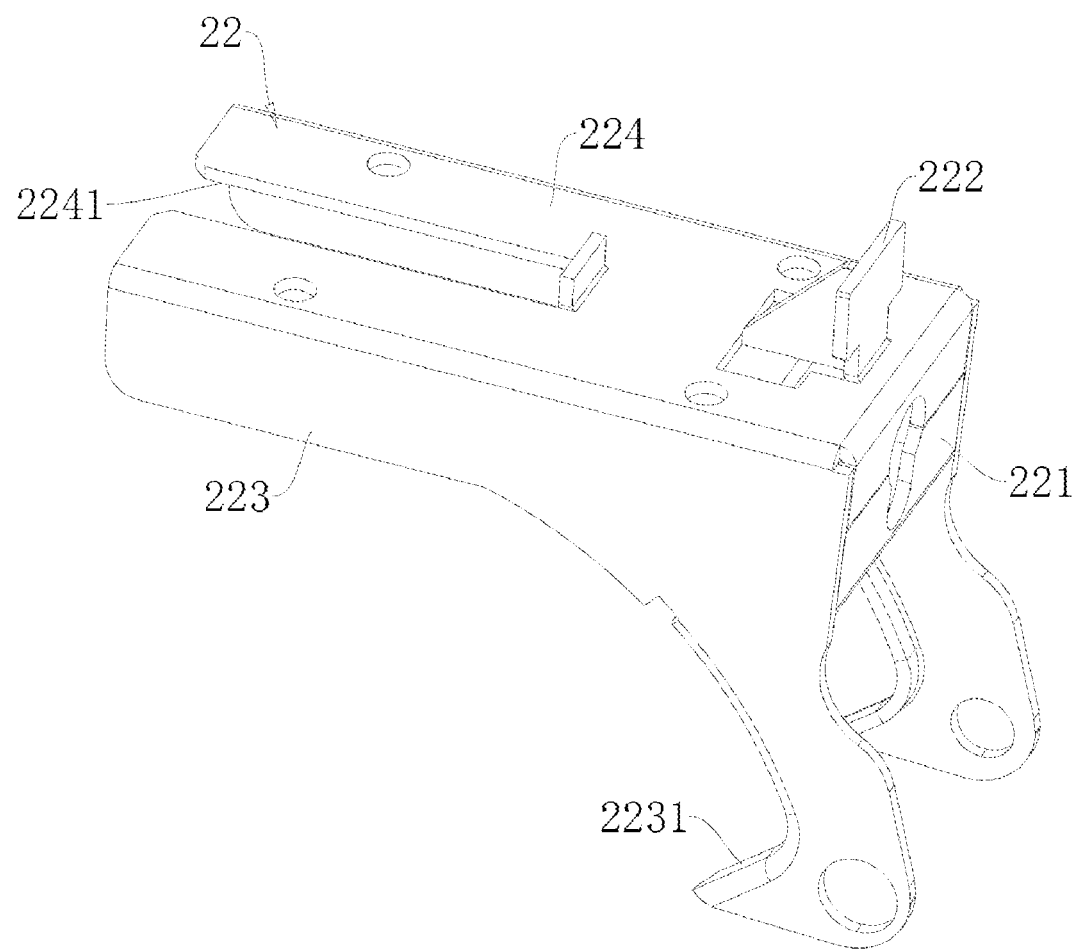
FIG. 15 is a schematic structural diagram of a metal framework according to an embodiment.

Referring to FIG. 8 and FIG. 15, in this embodiment, the base 2 includes a plastic housing 21 and a metal framework 22 mounted to the plastic housing 21. The metal framework 22 is fastened on the plastic housing 21 by using screws. The snapping seat 221 is a part of the metal framework 22, to cause the snapping seat 221 to have an ideal structural strength, thereby reducing a probability that the snapping seat 221 is broken by squeezing of the bolt head 431. The first slidable portion 222 is also a part of the metal framework 22.

The metal framework 22 further includes two metal liner panels 223 that are symmetrically arranged and a metal support plate 224 connected to tops of the metal liner panels 223 and attached to an inner top surface of the plastic housing 21. The snapping seat 221 connects the two metal liner panels 223. The first slidable portion 222 is connected to a top of the metal support plate 224. A bottom surface of the metal support plate 224 is the support plane 2241.

The metal liner panels 223 each are provided with an arcuate support portion 2231. The arcuate support portion 2231 is supported on an inner wall in the plastic housing 21 corresponding to the clamping groove 26. Therefore, a probability that the plastic housing 21 is broken during the clamping of the longitudinal bar 6 is relatively low.

Referring to FIG. 4, a limiting protruding piece 37 configured to abut against a lower edge of the plastic housing 21 at the sliding slot 241 is arranged on a side of the adjustment seat 3 facing the gun handle portion 25. The limiting protruding piece 37 is arranged obliquely upward along a direction approaching the gun handle portion 25. When the cross roof bar is not clamped on the longitudinal bar of the automobile, the fastening bolt 43 may be rotated to reduce a distance between the base 2 and the adjustment seat 3, so that the limiting protruding piece 37 abuts against the lower edge of the plastic housing 21 at the sliding slot 241. In this way, the base 2 and the adjustment seat 3 are locked relative to each other, thereby facilitating transfer of the entire cross roof bar.

Figure 16:
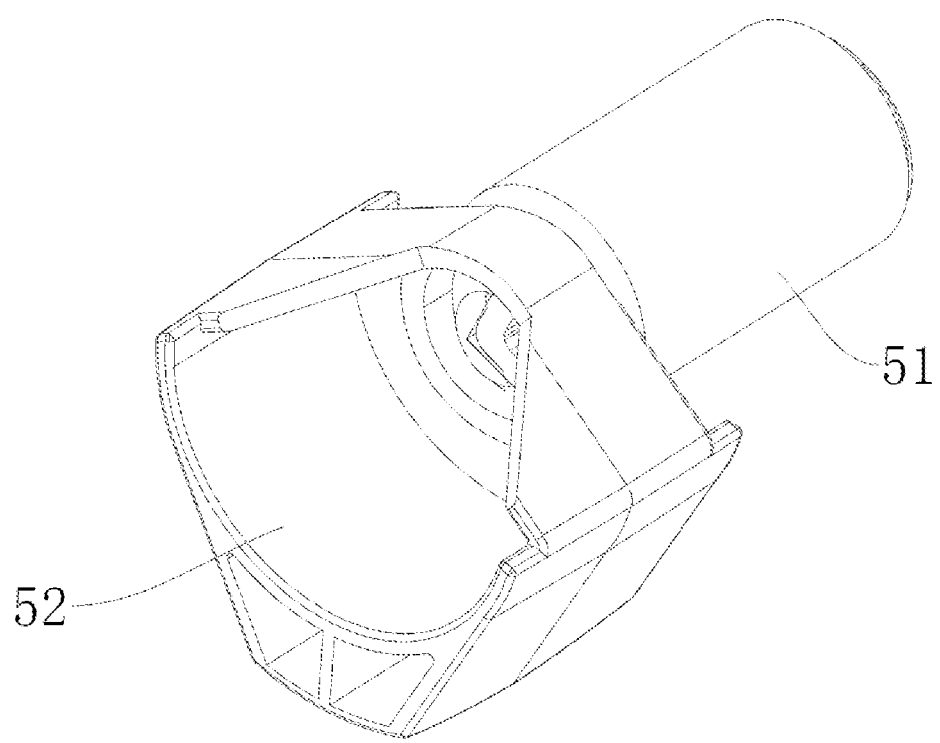
FIG. 16 is a schematic structural diagram of a locking assembly according to an embodiment.

Referring to FIG. 12 and FIG. 16, an unlocking hole 23 directly facing the snapping seat 221 is provided on a side of the base 2 facing away from the adjustment seat 3. A locking assembly is arranged on the base 2 between the snapping seat 221 and the unlocking hole 23.

The locking assembly includes a lock cylinder 51 and a locking member 52. A mounting sleeve 27 configured for the lock cylinder 51 to be mounted and arranged along a width direction of the base 2 is arranged outside the base 2. The mounting sleeve has a mounting hole configured for the lock cylinder 51 to be mounted. The lock cylinder 51 has a cylindrical housing, and is mounted in the mounting hole by means of interference mounting. The locking member 52 is mounted to an output head of the lock cylinder 51, and can be rotated synchronously with the output head of the lock cylinder 51.

Referring to FIG. 12, when the lock cylinder 51 is in a locked state, the locking member 52 is located between the bolt head 431 and the unlocking hole 23. Therefore, the fastening bolt 43 cannot be rotated by using a tool.

Referring to FIG. 13, when the lock cylinder 51 is in an unlocked state, the locking member 52 is rotated away from a space between the unlocking hole 23 and the bolt head 431. Therefore, the fastening bolt 43 can be rotated by using a tool mated with the bolt head 431 of the fastening bolt 43.

With reference to FIG. 1 to FIG. 16, an implementation principle of the cross roof bar is as follows. First, the lock cylinder 51 is adjusted to the unlocked state by using a corresponding key. Next, the fastening bolts 43 in the two clamping mechanisms 7 of the cross roof bar are rotated, to cause the distances between the bases 2 and the adjustment seats in the two clamping mechanisms 7 to be proper, that is, cause the longitudinal bars 6 to be exactly snapped between the bases 2 and the adjustment seats. Then, the longitudinal bar is mounted to the top of the automobile, to snap the longitudinal bars 6 between the corresponding bases 2 and the adjustment seats. The fastening bolts 43 in the clamping mechanisms 7 are further rotated to cause the clamping mechanisms 7 to clamp the longitudinal bars 6. In this case, the main crossbeam 1 can still be slid on the clamping mechanisms. After a position of the main crossbeam 1 on the roof is adjusted, the fastening bolts 43 in the clamping mechanisms 7 are further rotated. In this case, the fastening member 41 swings, and the upper fastening portion 411 in the fastening member 41 presses the main crossbeam 1 on an upper surface of the base 2, so that the main crossbeam 1 is fastened. Finally, the lock cylinder 51 is adjusted to the locked state by using the corresponding key. In this case, the locking member 52 mounted to the output head of the lock cylinder 51 is located between the unlocking hole 23 and the bolt head 431.

The present disclosure describes various embodiments of a cross roof rack for a vehicle. The present disclosure relates to the technical field of vehicle accessories, and provides a cross roof rack for a vehicle to resolve insecure mounting of a roof rack. The cross roof rack for a vehicle includes a cross bar. Fixing structures configured for fixing are symmetrically arranged on two sides of the cross bar. Each of the fixing structures includes a fixing seat and a clamping seat. The fixing seat is connected to a side wall of the cross bar. The clamping seat is arranged opposite to the fixing seat. An area for fixing is formed between the fixing seat and the clamping seat. A sliding groove is provided on an inner side wall of the cross bar along a length direction. A slidable block is arranged on a side of the clamping seat. The slidable block is slidably connected to an inner side wall of the sliding groove. A locking structure fixed to the fixing seat is arranged in the clamping seat. The locking structure includes a locking block, a locking rod, and two abutment strips. Various embodiments can be reliably mounted.

Figure 17:
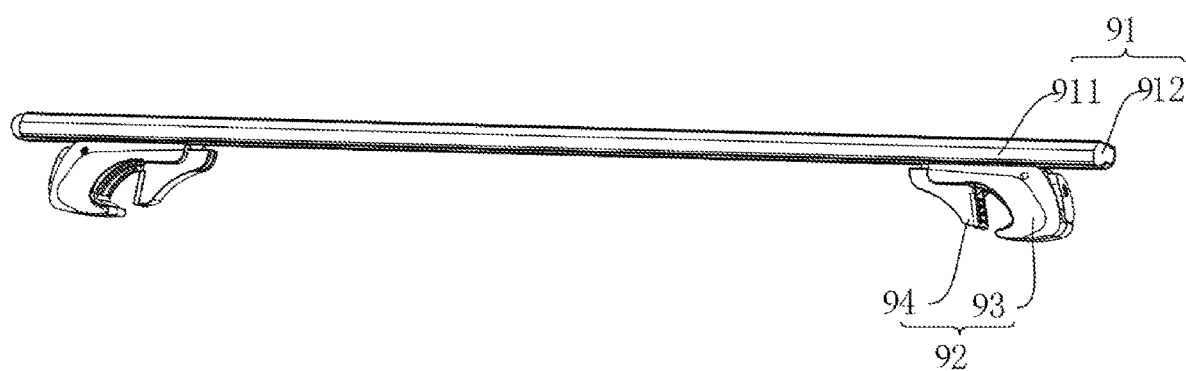
FIG. 17 is a schematic structural diagram of a cross roof rack for a vehicle according to an embodiment of the present disclosure.
Figure 18:
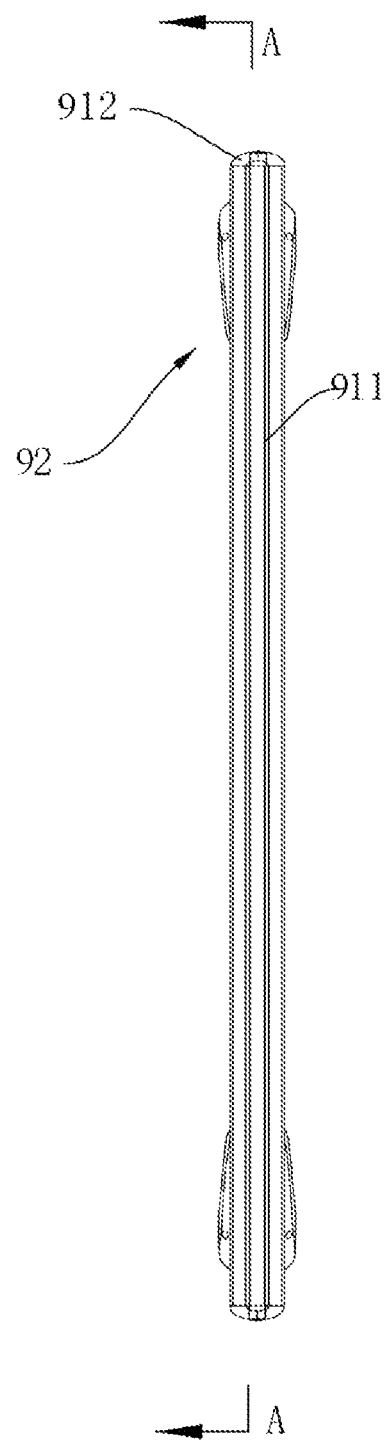
FIG. 18 is a top view of the cross roof rack for a vehicle according to an embodiment of the present disclosure.

Referring to FIG. 17 and FIG. 18, the cross roof rack for a vehicle includes a cross bar 91, and the cross bar 91 includes a bar body 911 and two end covers 912 mounted to two sides of the bar body 911 in a length direction. In the present disclosure, the bar body 911 may be made of an aluminum alloy material.

Figure 19:
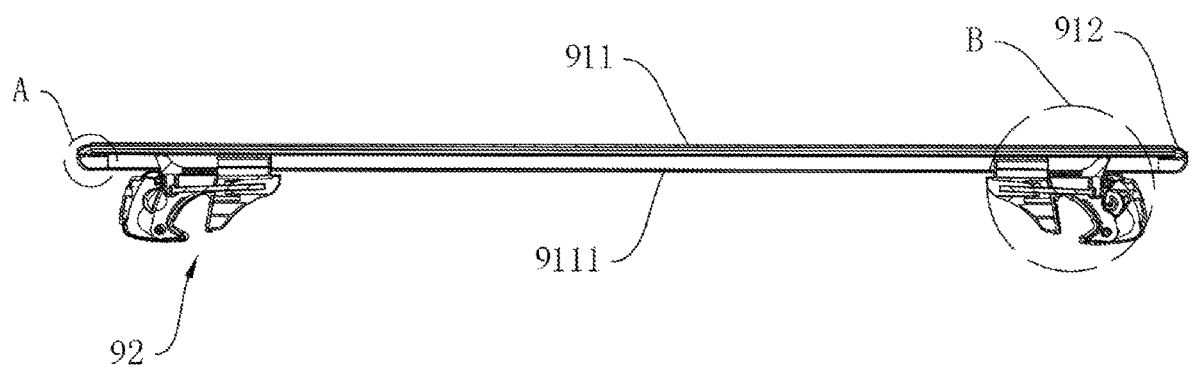
FIG. 19 is a cross-sectional view taken along line A-A in FIG. 18.
Figure 20:
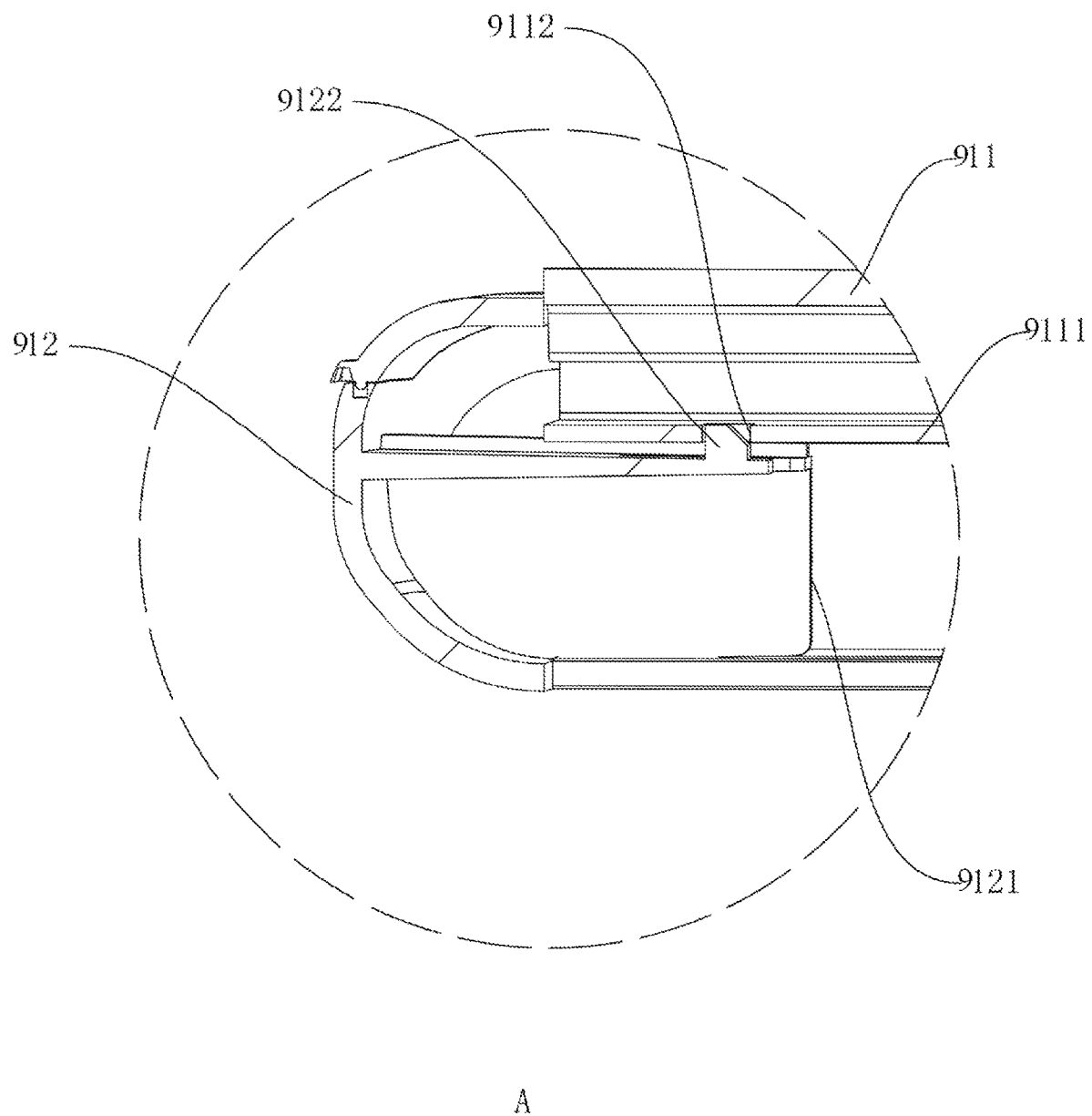
FIG. 20 is an enlarged view of part A in FIG. 19.

Referring to FIG. 19 and FIG. 20, a sliding groove 9111 is provided on the bar body 911 along a length direction, the sliding groove 9111 forms a rectangular opening at a bottom of the bar body 911, an insert 9121 is welded to a side wall of each of the end covers 912, the insert 9121 is inserted into an inner side wall of the sliding groove 9111 and matches the inner side wall of the sliding groove 9111, and a limiting block 9122 is welded to a side wall of the insert 9121. In the present disclosure, the limiting block 9122 may be made of a plastic material. A guide surface is obliquely arranged on a side wall of the limiting block 9122, a limiting groove 9112 is provided on the inner side wall of the sliding groove 9111, and the limiting block 9122 is inserted into an inner side wall of the limiting groove 9112, so that the end cover 912 is unlikely to be detached from the bar body 911.

Figure 21:
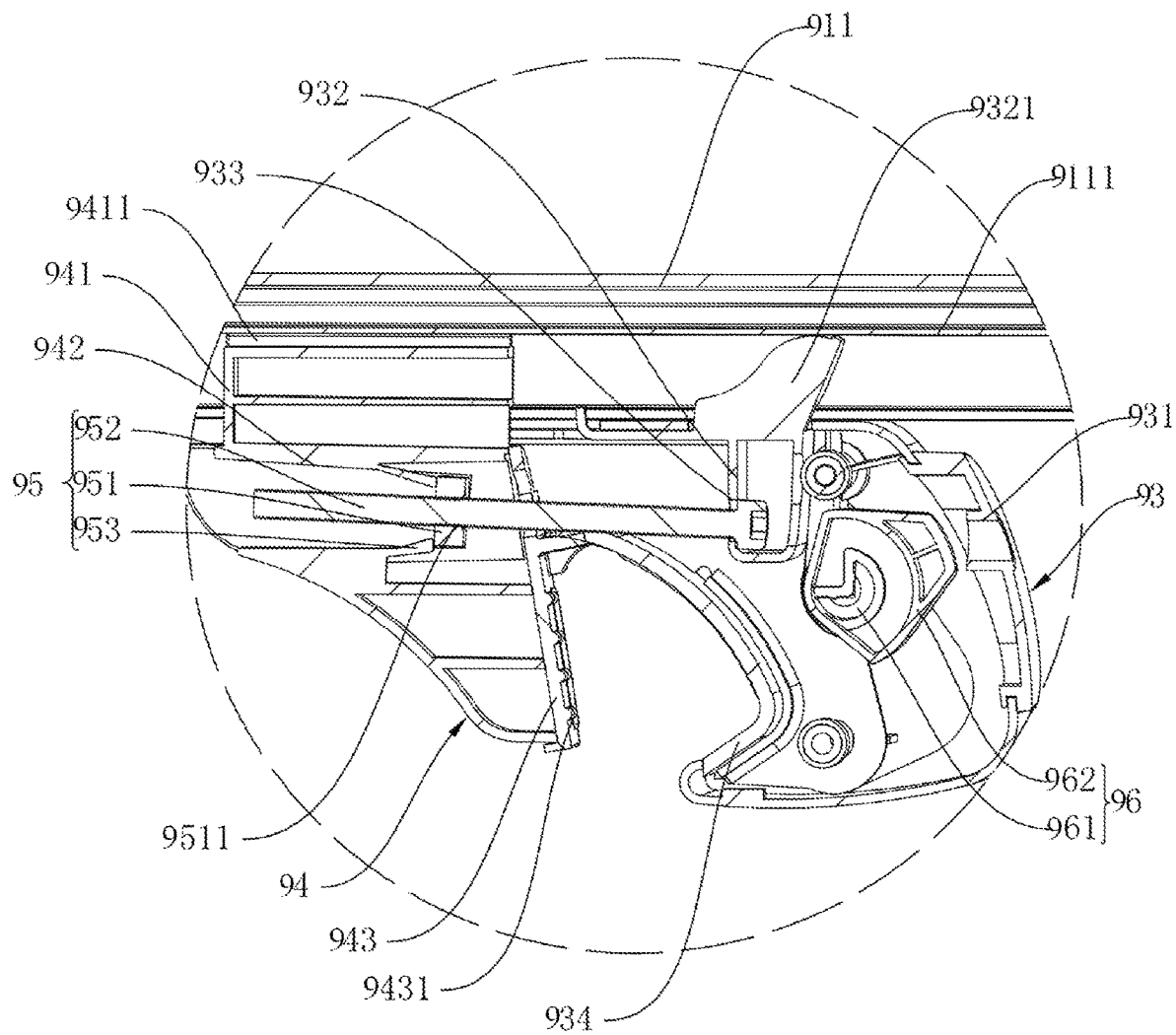
FIG. 21 is an enlarged view of part B in FIG. 19.

Referring to FIG. 17 and FIG. 21, fixing structures 92 configured to fix a bar on a top of a vehicle are symmetrically arranged on two sides of the bar body 911, the two fixing structures 92 are respectively located on two ends of the bar body 911 in a length direction, and each of the fixing structures 92 includes a clamping seat 94 and a fixing seat 93. The fixing seat 93 is a pistol-like structure, and the fixing seat 93 is fixedly connected to a side wall of the bar body 911. The clamping seat 94 is arranged opposite to the fixing seat 93, and an area for fixing the bar on the top of the vehicle is formed between the fixing seat 93 and the clamping seat 94. A slidable block 941 is welded to a side of the clamping seat 94 close to the bar body 911, the slidable block 941 has a T-shaped cross section, and the slidable block 941 is slidably connected to the inner side wall of the sliding groove 9111. A slidable strip 9411 is integrally formed on a side of the slidable block 941 away from the clamping seat 94, the slidable strip 9411 is arranged along a length direction of the slidable block 941, and the slidable strip 9411 slides on the inner side wall of the sliding groove 9111.

Referring to FIG. 21, a first elastic pad 943 is fixed to a side of the clamping seat 94 close to the fixing seat 93 by using glue. In the present disclosure, the first elastic pad 943 may be made of a rubber material. A second elastic pad 934 is fixed to a side of the fixing seat 93 close to the first elastic pad 943 by using glue. In the present disclosure, the second elastic pad 934 is made of a material the same as that of the first elastic pad 943, the first elastic pad 943 and the second elastic pad 934 are arranged opposite to each other, and a plurality of readings 9431 are arranged on both the first elastic pad 943 and the second elastic pad 934. The plurality of readings 9431 are arranged in sequence at an equal distance.

Referring to FIG. 21, a locking structure 95 configured to be fixed to the fixing seat 93 is mounted in the clamping seat 94, the locking structure 95 is configured to adjust a distance between the clamping seat 94 and the fixing seat 93, and the locking structure 95 includes a locking block 951, a locking rod 952, and two abutment strips 953.

Referring to FIG. 21, a mounting groove 942 is provided on the side of the clamping seat 94 away from the fixing seat 93, and the mounting groove 942 is provided along a length direction of the bar body 911. The locking block 951 is located on a bottom wall of the mounting groove 942, and the locking block 951 is a square block structure. One sides of the two abutment strips 953 are fixed to an inner side wall of the mounting groove 942 by using glue, and other sides of the two abutment strips 953 abut against the side wall of the locking block 951. In the present disclosure, the abutment strips 953 may be made of plastic materials. A locking hole 9511 is provided on the locking block 951 along a thickness direction, and the locking hole 9511 is a threaded hole. The locking rod 952 is threadedly connected to an inner side wall of the locking hole 9511, and an end of the locking rod 952 runs through the side wall of the clamping seat 94 and extends into the fixing seat 93.

Referring to FIG. 21, a connecting hole 931 configured for rotation of the locking rod 952 is provided on a side of the fixing seat 93 away from the clamping seat 94, and a connecting seat 932 is welded in the fixing seat 93. A through hole 933 is provided on a side wall of the connecting seat 932, and an end portion of the locking rod 952 is located in the through hole 933. A hexagonal slot is provided on the end portion of the locking rod 952, and a diameter of the end portion of the locking rod 952 is greater than a diameter of the through hole 933, so as to fix locking rod 952. An inner side wall of the through hole 933 is arranged coaxially with an inner side wall of the connecting hole 931.

Referring to FIG. 21, a stop 9321 is welded to a side of the connecting seat 932 close to the cross bar 91, the stop 9321 is located on the inner side wall of the sliding groove 9111, and the stop 9321 is in interference fit with the inner side wall of the sliding groove 9111.

Referring to FIG. 21, an anti-theft structure 96 configured to prevent rotation of the locking rod 952 is further mounted in the fixing seat 93, and the anti-theft structure 96 includes a lock cylinder 961 and a rotary sleeve 962. The lock cylinder 961 is arranged along a thickness direction of the fixing seat 93, the lock cylinder 961 rotatably connected to an inner side wall of the fixing seat 93, and the rotary sleeve 962 is sleeved on a side wall of the lock cylinder 961 and is in interference fit with the side wall of the lock cylinder 961.

Referring to FIG. 21, when the lock cylinder 961 is in a locked state, the rotary sleeve 962 is located between the connecting hole 931 and the locking rod 952. In this case, the locking rod 952 cannot be rotated by using a hardware tool.

Referring to FIG. 21, when the lock cylinder 961 is in an unlocked state, the rotary sleeve 962 is rotated away from a space between the connecting hole 931 and the locking rod 952. In this case, the locking rod 952 may be rotated by using a hardware tool mated with the end portion of the locking rod 952.

An implementation principle of the cross roof rack for a vehicle in the embodiments of the present disclosure is as follows. An operator inserts a key into the lock cylinder 961, and rotates the key to cause the lock cylinder 961 to enter the unlocked state. At this time, a hardware tool is inserted into the connecting hole 931, to cause the hardware tool to extend through the through hole 933 to be mated with the end portion of the locking rod 952. The locking rod 952 is rotated, so that the clamping seat 94 moves, and the slidable block 941 slides in the sliding groove 9111. When the bar on the top of the vehicle is clamped between the clamping seat 94 and the fixing seat 93, the locking rod 952 is rotated reversely to drive the clamping seat 94 to move toward the fixing seat 93. When the clamping seat 94 abuts against the bar on the top of the vehicle, the locking rod 952 is further rotated, so that the slidable block 941 on an upper part of the clamping seat 94 further moves to turn and press against a bottom of the sliding groove 9111, until the bar on the top of the vehicle is clamped between the clamping seat 94 and the fixing seat 93. The above operation is repeated to clamp the bar on the top of the vehicle between the clamping seat 94 and the fixing seat 93 on the other side. Finally, the key is rotated to cause the lock cylinder 961 to enter the locked state, so that the rotary sleeve 962 is located between the connecting hole 931 and the locking rod 952. In this way, the operation is completed. By arranging the fixing seat 93, the clamping seat 4, the locking block 951, the locking rod 952, and the abutment strips 953, the mounting is reliable, and a possibility that the cross bar 91 is detached from the bar on the top of the vehicle on a bumpy road is reduced, thereby facilitating stable mounting between the clamping seat 94 and the fixing seat 93. In addition, the structure is simple, and the mounting is convenient, thereby reducing assembly costs.

The above embodiments are exemplary embodiments of the present disclosure, but the scope of protection of the present disclosure is not limited thereto. Therefore, all equivalent changes made in accordance with the structure, shape, and principle of the present disclosure shall be covered by the scope of protection of the present disclosure.

What is claimed is:

1. An apparatus, comprising:
    a main crossbeam,
    a base configured to abut against one side of a longitudinal bar, an adjustment seat configured to abut against an other side of the longitudinal bar, and
a fastening assembly that connects the base to the adjustment seat, wherein:
the main crossbeam has a first sliding groove arranged along a length direction and having an opening on a lower side;
the fastening assembly comprises a fastening member, a fastening nut, and a fastening bolt;
the fastening member is swingably mounted to the adjustment seat and comprises a lower fastening portion located in the adjustment seat and an upper fastening portion connected to the lower fastening portion and slidably mounted to the first sliding groove;
the fastening member is turnable to cause the upper fastening portion to press the main crossbeam on a top of the base;
the fastening nut is rotatably mounted to the lower fastening portion, an axis of rotation of the fastening nut is parallel to a width direction of the adjustment seat, and a threaded hole of the fastening nut is arranged perpendicular to the axis of rotation of the fastening nut; and
a bolt head of the fastening bolt is against the base, and a screw of the fastening bolt is threadedly mated with the fastening nut.

2. The apparatus according to claim 1, wherein the base has a first slidable portion slidably mated with the main crossbeam in the first sliding groove, and the adjustment seat has a second slidable portion slidably mated with the main crossbeam in the first sliding groove.

3. The apparatus according to claim 2, wherein the base is a housing structure and is provided with a sliding slot configured for the adjustment seat to be inserted; and the base has therein a support plane configured for a top surface of the adjustment seat to be slidably attached.

4. The apparatus according to claim 3, wherein a limiting protruding piece configured to abut against a lower edge of the sliding slot is arranged on a side of the adjustment seat facing the bolt head.

5. The apparatus according to claim 2, wherein the second slidable portion has an abutment sidewall configured for the upper fastening portion to abut, a spring groove is provided on an inner wall of the adjustment seat close to the bolt head, a pressure spring is arranged in the spring groove, and one end of the pressure spring abuts against the lower fastening portion and an other end of the pressure spring abuts against a bottom surface of the spring groove.

6. The apparatus according to claim 1, wherein a clamping groove configured to clamp the longitudinal bar is formed outside the base, at the clamping groove, the base has an upper abutment sidewall configured for an upper side of the longitudinal bar to abut and a lower abutment sidewall configured for a lower side of the longitudinal bar to abut, and the adjustment seat has a fastening sidewall configured for the lower side of the longitudinal bar to abut.

7. The apparatus according to claim 1, wherein the lower fastening portion comprises a swingable plate and two supporting protruding pieces arranged perpendicular to the swingable plate and opposite to each other, and rotation holes configured for the fastening nut to be rotatably mounted are arranged opposite to each other on the supporting protruding pieces.

8. The apparatus according to claim 1, wherein the base comprises a plastic housing and a metal framework mounted in the plastic housing, and the bolt head of the fastening bolt is against the metal framework.

9. The apparatus according to claim 8, wherein the metal framework is further provided with an arcuate support portion, and the arcuate support portion is supported in the plastic housing and configured to clamp a part of an inner wall of the longitudinal bar.

10. The apparatus according to claim 1, wherein the base is provided with an unlocking hole directly facing the bolt head, a locking assembly is arranged between the bolt head and a sidewall of the base provided with the unlocking hole, the locking assembly comprises a lock cylinder mounted to the base and a locking member mounted to an output head of the lock cylinder; when the lock cylinder is in a locked state, the locking member is shielded between the bolt head and the unlocking hole; or when the lock cylinder is in an unlocked state, the locking member moves away from a space between the bolt head and the unlocking hole.

11. An apparatus for a vehicle, comprising:
a cross bar; and
fixing structures being symmetrically arranged on two sides of the cross bar, wherein:
each of the fixing structures comprises a fixing seat and a clamping seat,
the fixing seat is connected to a side wall of the cross bar,
the clamping seat is arranged opposite to the fixing seat,
an area for fixing is formed between the fixing seat and the clamping seat,
a sliding groove is provided on an inner side wall of the cross bar along a length direction,
a slidable block is arranged on a side of the clamping seat, the slidable block is slidably connected to an inner side wall of the sliding groove,
a locking structure fixed to the fixing seat is arranged in the clamping seat,
the locking structure comprises a locking block, a locking rod, and two abutment strips,
a mounting groove is provided on a side wall of the clamping seat,
the locking block is arranged on a bottom wall of the mounting groove,
the two abutment strips are arranged on an inner side wall of the mounting groove and abut against a side wall of the locking block,
a locking hole is provided on the side wall of the locking block along a thickness direction,
the locking rod is threadedly connected in the locking hole, a side of the locking rod runs through the clamping seat and extends into the fixing seat, and
a connecting hole configured for rotation of the locking rod is provided on a side of the fixing seat away from the clamping seat.

12. The apparatus for a vehicle according to claim 11, wherein a connecting seat is arranged in the fixing seat, a through hole runs through a side wall of the connecting seat, a side of the locking rod is arranged on an inner side wall of the through hole, and the inner side wall of the through hole is arranged coaxially with an inner side wall of the connecting hole.

13. The apparatus for a vehicle according to claim 12, wherein a stop is arranged on a side of the connecting seat close to the cross bar, and the stop is arranged on the inner side wall of the sliding groove and is in interference fit with the inner side wall of the sliding groove.

14. The apparatus for a vehicle according to claim 11, wherein an anti-theft structure configured to prevent rotation of the locking rod is arranged in the fixing seat, the anti-theft structure comprises a lock cylinder and a rotary sleeve, the lock cylinder and the rotary sleeve are both arranged in the fixing seat, the lock cylinder is rotatably connected in the fixing seat, the rotary sleeve is sleeved on a side wall of the lock cylinder, and when the lock cylinder is in a locked state, the rotary sleeve is shielded between the connecting hole and the locking rod, or when the lock cylinder is in an unlocked state, the rotary sleeve moves away from a space between the connecting hole and the locking rod.

15. The apparatus for a vehicle according to claim 11, wherein a first elastic pad is arranged on a side of the clamping seat close to the fixing seat, a second elastic pad is arranged on a side of the fixing seat close to the clamping seat, and the first elastic pad and the second elastic pad are arranged opposite to each other.

16. The apparatus for a vehicle according to claim 15, wherein a plurality of readings are arranged on the first elastic pad and the second elastic pad.

17. The apparatus for a vehicle according to claim 11, wherein the cross bar comprises a bar body and two end covers, the two end covers are respectively located on two sides of the bar body in a length direction, an insert is arranged on a side of each of the end covers, the insert is inserted into the sliding groove of the bar body, and the insert matches the inner side wall of the sliding groove.

18. The apparatus for a vehicle according to claim 17, wherein a limiting block is arranged on a side wall of the insert, and a limiting groove configured for the limiting block to be inserted is provided on the inner side wall of the sliding groove.

\* \* \* \* \*